(12) United States Patent
Watanabe et al.

(10) Patent No.: US 9,986,226 B2
(45) Date of Patent: May 29, 2018

(54) VIDEO DISPLAY METHOD AND VIDEO DISPLAY APPARATUS

(71) Applicant: Panasonic Intellectual Property Management Co., Ltd., Osaka (JP)

(72) Inventors: Tatsumi Watanabe, Aichi (JP); Ken Mashitani, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 269 days.

(21) Appl. No.: 14/786,739

(22) PCT Filed: Oct. 17, 2014

(86) PCT No.: PCT/JP2014/005289
§ 371 (c)(1),
(2) Date: Oct. 23, 2015

(87) PCT Pub. No.: WO2015/132828
PCT Pub. Date: Sep. 11, 2015

(65) Prior Publication Data
US 2016/0080729 A1    Mar. 17, 2016

(30) Foreign Application Priority Data

Mar. 6, 2014    (JP) .................................. 2014-043539

(51) Int. Cl.
*H04N 13/00* (2018.01)
*H04N 13/04* (2006.01)
(Continued)

(52) U.S. Cl.
CPC ..... *H04N 13/0404* (2013.01); *G02B 27/2214* (2013.01); *G03B 35/24* (2013.01);
(Continued)

(58) Field of Classification Search
CPC .......... H04N 13/0404; H04N 13/0484; H04N 13/0022; H04N 13/0225; H04N 13/0409;
(Continued)

(56) References Cited

U.S. PATENT DOCUMENTS 6,791,570 B1    9/2004  Schwerdtner et al.
8,319,824 B2 *  11/2012 De La Barre ...... H04N 13/0409
                                                          348/42
(Continued)

FOREIGN PATENT DOCUMENTS

JP          9-233500       9/1997
JP          2001-506435    5/2001
(Continued)

OTHER PUBLICATIONS

International Search Report dated Jan. 13, 2015 in corresponding International Application No. PCT/JP2014/005289.
(Continued)

*Primary Examiner* — Mishawn Hunter
(74) *Attorney, Agent, or Firm* — Wenderoth, Lind & Ponack, L.L.P.

(57) ABSTRACT

A video display method using a display apparatus for displaying a glasses free 3D video, the display apparatus including a display unit in which sub-pixels constituting pixels are arranged in a matrix, the video display method including: (a) displaying, in a row of sub-pixels of the display unit, a video in which a left-eye video and a right-eye video are disposed alternately in units of display each unit made up of n sub-pixels, where n is an integer equal to or greater than 2; and (b) detecting a distance from the display unit to a viewer, wherein in step (a), if the detected distance is different from a predetermined distance, the number of sub-pixels of at least one unit of display, among a plurality
(Continued)

of units of display included in the row of sub-pixels, is varied as a function of the detected distance.

8 Claims, 26 Drawing Sheets

(51) Int. Cl.
  *G03B 35/24* (2006.01)
  *H04N 13/02* (2006.01)
  *G02B 27/22* (2018.01)

(52) U.S. Cl.
  CPC ..... *H04N 13/0022* (2013.01); *H04N 13/0225* (2013.01); *H04N 13/0409* (2013.01); *H04N 13/0422* (2013.01); *H04N 13/0475* (2013.01); *H04N 13/0484* (2013.01)

(58) Field of Classification Search
  CPC ........... H04N 13/0422; H04N 13/0475; G02B 27/2214; G03B 35/24
  See application file for complete search history.

(56) References Cited

U.S. PATENT DOCUMENTS

| 8,681,174 | B2 | 3/2014 | Nam et al. |
| 8,964,009 | B2* | 2/2015 | Yoshida ............. G02B 27/2214 348/42 |
| 9,432,657 | B2* | 8/2016 | Saito ................. H04N 13/0404 |
| 2010/0007723 | A1 | 1/2010 | Yasui |
| 2011/0102423 | A1 | 5/2011 | Nam et al. |
| 2012/0218325 | A1 | 8/2012 | Hiroki et al. |
| 2012/0249530 | A1 | 10/2012 | Fukushima et al. |
| 2014/0009463 | A1 | 1/2014 | Watanabe et al. |
| 2014/0049622 | A1 | 2/2014 | Tsurumi et al. |
| 2014/0098205 | A1* | 4/2014 | Usukura ............ H04N 13/0409 348/59 |
| 2014/0219546 | A1 | 8/2014 | Minekawa et al. |
| 2014/0247329 | A1 | 9/2014 | Nakamura et al. |
| 2014/0320614 | A1* | 10/2014 | Gaudreau .......... G02B 27/2214 348/51 |

FOREIGN PATENT DOCUMENTS

| JP | 2002-303821 | 10/2002 |
| JP | 2004-282217 | 10/2004 |
| JP | 2010-020178 | 1/2010 |
| JP | 2011-101366 | 5/2011 |
| JP | 2012-190017 | 10/2012 |
| JP | 2013-069951 | 4/2013 |
| JP | 2014-016477 | 1/2014 |
| WO | 98/27451 | 6/1998 |
| WO | 2012/131887 | 10/2012 |
| WO | 2012/161075 | 11/2012 |
| WO | 2012/176445 | 12/2012 |
| WO | 2013/073028 | 5/2013 |

OTHER PUBLICATIONS

Hamagishi et al., "Autostereoscopic 3D Displays using Image-Splitter Method," the institute of image information and television engineers, vol. 51, No. 7, pp. 1070-1078, 1997 (with abstract & partial English translation).

* cited by examiner (a)

Color image (b)

P

Template geometry data Tp[k,s]

(c) Tp[k,s]

(i,j)

Contour image
(Image represented by E(i, j))

VIDEO DISPLAY METHOD AND VIDEO DISPLAY APPARATUS

TECHNICAL FIELD

The present disclosure relates to a video display method and a video display apparatus, for displaying a glasses free 3D video.

BACKGROUND ART

Technologies for displaying a stereoscopic video without requiring special glasses are known (e.g., see Patent Literatures (PTL) 1 to 3, and Non-patent Literature (NPL) 1). These technologies need a component, such as a parallax barrier (a disparity barrier) or a Lenticular lens, set up in front of a display panel on an observer side, such as an LCD panel, a plasma display panel (PDP), and an organic EL panel.

CITATION LIST

Patent Literature

[PTL 1] Japanese Unexamined Patent Application Publication No. H9-233500
[PTL 2] WO2012/131887
[PTL 3] Japanese Unexamined Patent Application Publication No. 2002-303821

Non Patent Literature

[NPL 1] Hamagishi et. al, "Autostereoscopic 3D Displays using Image-Splitter Method," the institute of image information and television engineers, Vol. 51, No. 7, pp. 1070-1078 (1997)

SUMMARY OF INVENTION

Technical Problem

In such a video display apparatus which displays a so-called glasses free 3D video, positions at which an observer (a viewer) can properly view the 3D video are limited. Thus, the video display apparatus provides display control over a video as a function of a viewing position of the viewer, as is the case in the technologies disclosed in PTLs 1 to 3 mentioned above.

The present disclosure provides a video display method, etc., which allow smooth (stably) display of a glasses free 3D video, following changes in viewing position of a viewer.

Solution to Problem

A video display method according to the present disclosure is a video display method using a display apparatus for displaying a glasses free 3D video, the display apparatus including a display unit in which sub-pixels constituting pixels are arranged in a matrix, the video display method including: (a) displaying, in a row of sub-pixels of the display unit, a video in which a left-eye video and a right-eye video are disposed alternately in units of display each unit made up of n sub-pixels, where n is an integer equal to or greater than 2; and (b) detecting a distance from the display unit to a viewer, wherein in step (a), if the detected distance is different from a predetermined distance, the number of sub-pixels of at least one unit of display, among a plurality of units of display included in the row of sub-pixels, is varied as a function of the detected distance.

A video display method according to the present disclosure is a video display method using a display apparatus for displaying a glasses free 3D video, the display apparatus including a display unit in which sub-pixels constituting pixels are arranged in a matrix, the video display method including: (a) displaying, in a row of sub-pixels of the display unit, a video in which a left-eye video and a right-eye video are disposed alternately in units of n sub-pixels, where n is an integer equal to or greater than 2; and (b) detecting a distance from the display unit to a viewer and a position of the viewer in a horizontal direction, wherein in step (a), display positions of the left-eye video and the right-eye video in the row of sub-pixels are shifted by a predetermined number of sub-pixels, based on the detected distance from the display unit to the viewer and the detected position of the viewer in the horizontal direction.

Advantageous Effects of Invention

A video display method according to the present disclosure allows smooth display of a glasses free 3D video, following changes in viewing position of a viewer.

Figure 1:
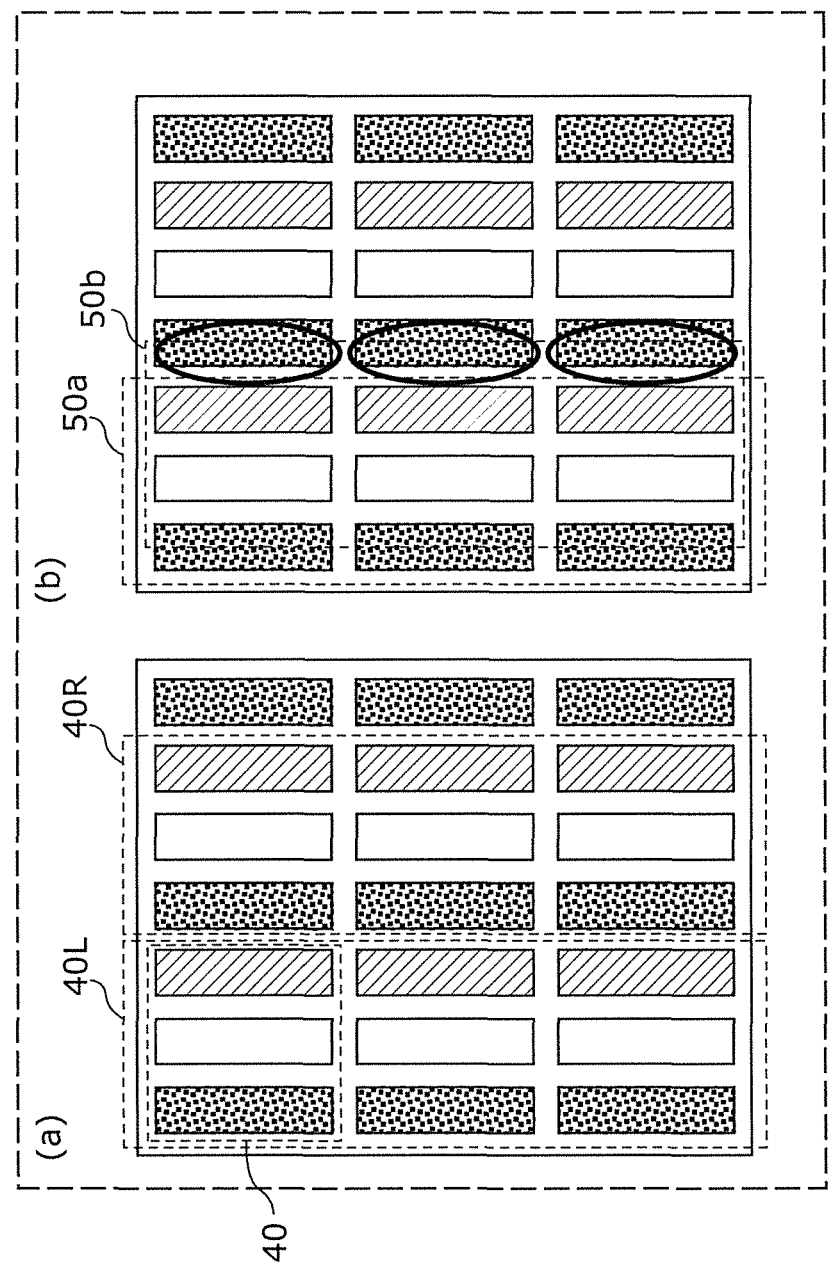
FIG. 1 is a diagram for illustrating a common arrangement of pixels.

DESCRIPTION OF EMBODIMENTS (Underlying Knowledge Forming Basis of the Present Disclosure)

So-called glasses free 3D video display apparatuses which display a stereoscopic video, without requiring special glasses, are known. In such video display apparatuses, a parallax barrier or a Lenticular lens (separation means) is set up in front of a display panel on an observer side, such as an LCD panel, PDP, and an organic EL display. This presents a left-eye video and a right-eye video which are displayed on the display panel to the observer separately, and the observer is allowed to view a stereoscopic video.

For example, a glasses-free video display apparatus utilizing a parallax barrier, as disclosed in NPL 1, is known as such a video display apparatus. The video display apparatus disclosed in NPL 1 includes a parallax barrier, and a video display panel in which a column of left-eye pixels aligned in the vertical direction and a column of right-eye pixels aligned in the vertical direction are alternately formed.

The parallax barrier has a large number of slit-shaped open portions extending vertically, and a light blocking portion extending vertically is formed between the open portions.

It should be noted that binocular parallax, which allows a human to perceive a left-eye video configured of left-eye pixels and a right-eye video configured of right-eye pixels as a stereoscopic video, exists between the left-eye video and the right-eye video. The left-eye video (hereinafter, also described as a left-eye image) enters the left eye of the observer through the open portions and the right-eye video (hereinafter, also described as a right-eye image) enters the right eye through the open portions when his/her head is at a predetermined position (position in emmetropia). This allows the observer to recognize the stereoscopic video.

It should be noted that, at this time, the right-eye video is blocked by the light blocking portions and does not enter the left eye of the observer, and the left-eye video is blocked by the light blocking portions and does not enter the right eye.

As such, in the glasses free 3D video display apparatuses, typically, disparity images (the left-eye image and the right-eye image) are disposed alternately by column of image, the disparity images are separated by separation means, such as a parallax barrier, and presented to the observer.

In the stereoscopic video display method disclosed in PTL 1, a left-eye picture element group which displays a left-eye video, and a right-eye picture element group which displays a right-eye video are alternately displayed along the horizontal direction, causing a light beam from the left-eye picture element group and a light beam from the right-eye picture element group to be separated and enter the left eye and the right eye, respectively, of the observer. The left and right picture element groups each consist of a red picture element, a green picture element, and a blue picture element aligned in the horizontal direction.

The stereoscopic video display method disclosed in PTL 1 provides control to switch a video displayed for each picture element between a left-eye video and a right-eye video, as a function of a position of the head of the observer. In the approach of PTL 1, the interocular distance corresponds to one pixel, that is, a set of three sub-pixels (R, G, B). This allows the switching of the left-eye video and the right-eye video to be controlled, following the horizontal movement, by ⅓ of the interocular distance, of the observer's head.

In the stereoscopic video display method disclosed in PTL 2, a sub-pixel region (which includes sub-pixels of m sets of disparity pixels) to be assigned to an optical aperture is determined, as a function of the observer's position, and disparity information identified by a disparity number is given to pixels of the sub-pixel region.

The set of disparity images included in the sub-pixel region assigned to each optical aperture depends on the observer's position. Sub-pixels at a boundary between adjacent sub-pixel regions are displayed, mixed with two pieces of disparity information given to sub-pixels in the adjacent sub-pixel regions. In other words, disparity images corresponding to disparity information between the two pieces of disparity information are interpolated.

In the stereoscopic video display method disclosed in PTL 3, a view point of an observer on a display screen is detected, and the orientation of the display panel is controlled to move left-eye and right-eye images in the horizontal direction so that a target image in the left-eye and right-eye images at the view point coincides on the screen. The stereoscopic video display method disclosed in PTL 3 also provides control to shift the entire image in the side-to-side direction, as a function of the horizontal movement of the view point.

These technologies, however, have the following drawbacks.

If the disparity images are disposed alternately by column of image as disclosed in NPL 1, positions where the observer at a preferred viewing distance Lc can properly view the stereoscopic video are spaced apart at every interocular distance E in the horizontal direction. Thus, if at least one of the observer's eyes is off the above positions, the observer ends up viewing a mixed image in which the left-eye image and the right-eye image are not well separated. In short, this ends up causing cross-talk.

In the video display method disclosed in PTL 1, as shown in (a) of FIG. 1, one pixel 40 constituting a disparity image (a left-eye image 40L or a right-eye image 40R) includes three sub-pixels aligned in the horizontal direction. FIG. 1 is a diagram for illustrating the arrangement of pixels in the video display method disclosed in PTL 1.

In the video display method disclosed in PTL 1, the display position of a disparity image in the horizontal direction is switched (shifted) in units of sub-pixels if the head, positioned at the preferred viewing distance Lc, moves by a distance of E/3 in the horizontal direction, at which time, as shown in (b) of FIG. 1, the relationship between the open portions having vertically long stripe shapes and the display position varies as the observer's position changes. Thus, color moire is likely to occur if the observer is looking into near the display position immediately before the disparity image is switched. Specifically, for example, as a region pierced through an open portion shifts from a region 50a to a region 50b, color moire results.

Moreover, if the observer is positioned at a viewing distance Ld different from the preferred viewing distance Lc, the shifting of the display position of the disparity image in units of sub-pixels may fail to follow the movement of the observer's head.

The video display method disclosed in PTL 2 provides control to reduce or increase the number of disparities orientated at which the observer at a position off a preferred viewing position can hardly recognize a stereoscopic video, by partially changing the number m of disparity images (one sub-pixel constitutes one disparity, and the number m of disparity images is a variable). However, a disparity image generated using interpolated pixels that are generated from its adjacent disparity images is required, and cross-talk due to effects of the generated disparity image may undesirably occur.

The video display method disclosed in PTL 3 is directed to a technology adapted only to horizontal movements of the observer's head, and which mechanically changes the orientation of the entirety of a display panel, using a variable-angle actuator. In the video display method disclosed in PTL 3, the same pixel used for one of left-eye and right-eye images is used for a pixel which is missed by changing the orientation of the display panel. This likely to cause 2D view in some part of a stereoscopic video.

Against the technologies as described above, the inventors disclose herein a novel video display apparatus (a video display method) which can smoothly display a glasses free 3D video, following changes in viewing position of an observer.

Hereinafter, embodiments according to the present disclosure will be described in detail, with reference to the accompanying drawings. It should be noted that unnecessarily detailed description may be omitted. For example, detailed description of well-known matters or description previously set forth with respect to substantially the same configuration may be omitted. This is to avoid unnecessary redundancy in the description below and for facilitating an understanding by a person skilled in the art.

The accompanying drawings and the description below are for a thorough understanding of the present disclosure by a person skilled in the art, and are not intended to be limiting the subject matter recited in the claims appended hereto.

Embodiments 1 through 4 are to be described below.

Embodiment 1

In the following, an embodiment 1 is to be described, with reference to FIGS. 2 through 12.

In the embodiment 1, a video display apparatus is described which displays a video in which a left-eye video and a right-eye video are disposed alternately in units of display in a row of sub-pixels in the horizontal direction in a display panel. The units of display are each four sub-pixels. A video display apparatus according to the embodiment 1 has a feature that the number of sub-pixels of at least one unit of display is varied as a function of a viewing distance of an observer to the video display apparatus.

[Configuration]

Figure 2:
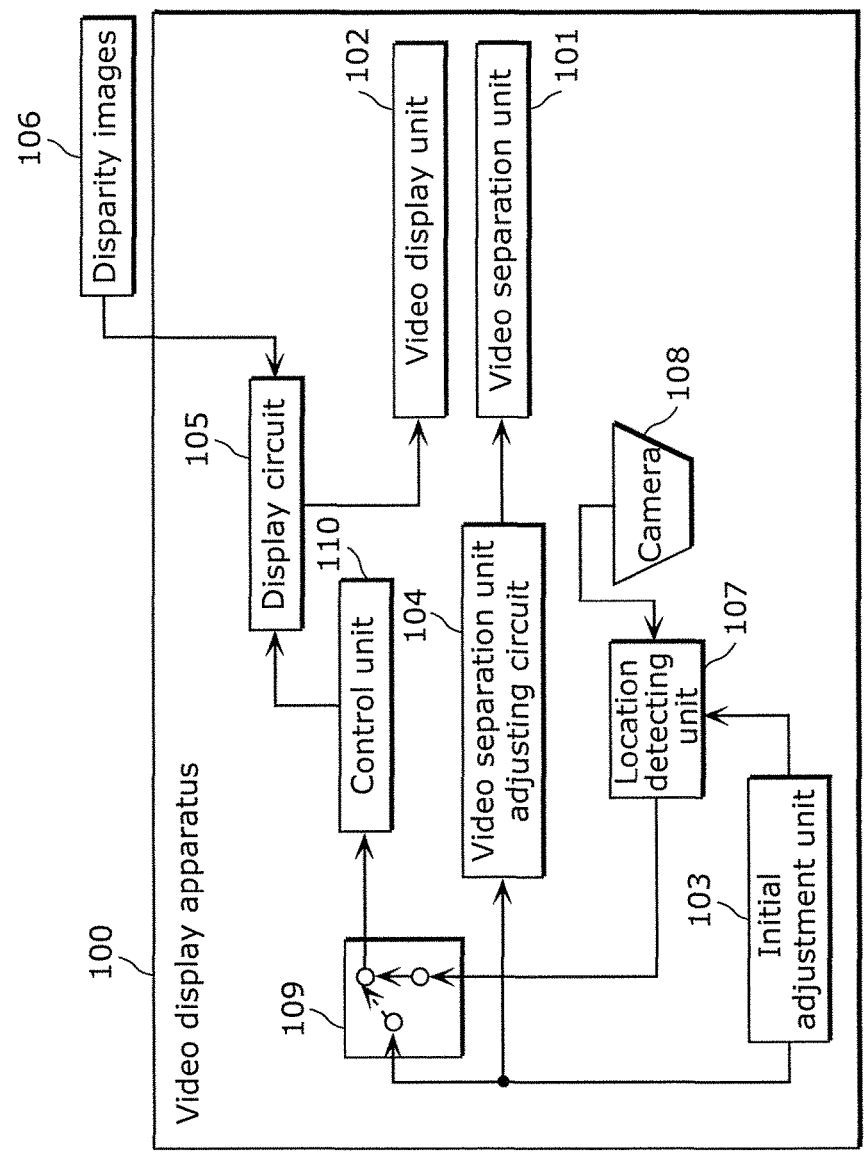
FIG. 2 is a block diagram of a configuration of a video display apparatus according to an embodiment 1.

FIG. 2 is a block diagram of a configuration of the video display apparatus according to the embodiment 1. A video display apparatus 100 according to the embodiment 1 includes an initial adjustment unit 103, a video display unit 102, a display circuit 105, a video separation unit 101, a video separation unit adjusting circuit 104, a control unit 110, a signal switching unit 109, a location detecting unit 107, and a camera 108.

The initial adjustment unit 103 adjusts the video separation unit adjusting circuit 104, the location detecting unit 107, and the signal switching unit 109. Specifically, the initial adjustment unit 103 makes adjustments related to the video display unit 102 and the video separation unit 101, for example.

The video display unit 102 displays two-dimensional disparity images, based on output from the display circuit 105. The video display unit 102 is by way of example of a display unit. The video display unit 102 is, for example, a display panel, such as an LCD panel, PDP, and an organic EL panel. It should be noted that the display circuit 105 may be included in the video display unit 102.

The video separation unit 101 is, for example, a disparity barrier (a parallax barrier), and presents, at a predetermined position, an image from the video display unit 102 as the disparity images. While examples of the structure of the video separation unit 101 include a step barrier structure having squared openings, the structure of the video separation unit 101 according to the embodiment 1 has a slanted barrier, details of which is described below. It should be noted that the video separation unit 101 is by way of example of a separation unit, which is disposed facing the video display unit 102, for separating the left-eye video and the right-eye video and presenting them to the observer.

The video separation unit 101 is configured of open portions and blocking portions. In the embodiment 1, a device is used which applies a voltage or the like to change the open portions and blocking portions (a device which can vary the transmittance of light). Examples of such a device include a TFT LCD panel. The video separation unit 101, however, may be a fixed barrier made of a thin film or a highly transparent material (a glass or the like). The video separation unit 101 may be a Lenticular lens, for example.

The video separation unit adjusting circuit 104 adjusts distance between the video separation unit 101 and the video display unit 102, and adjusts a position of the video separation unit 101, for example.

Disparity images 106 include a left-eye image and a right-eye image which are displayed on the video display unit 102 via the display circuit 105.

Figure 3:
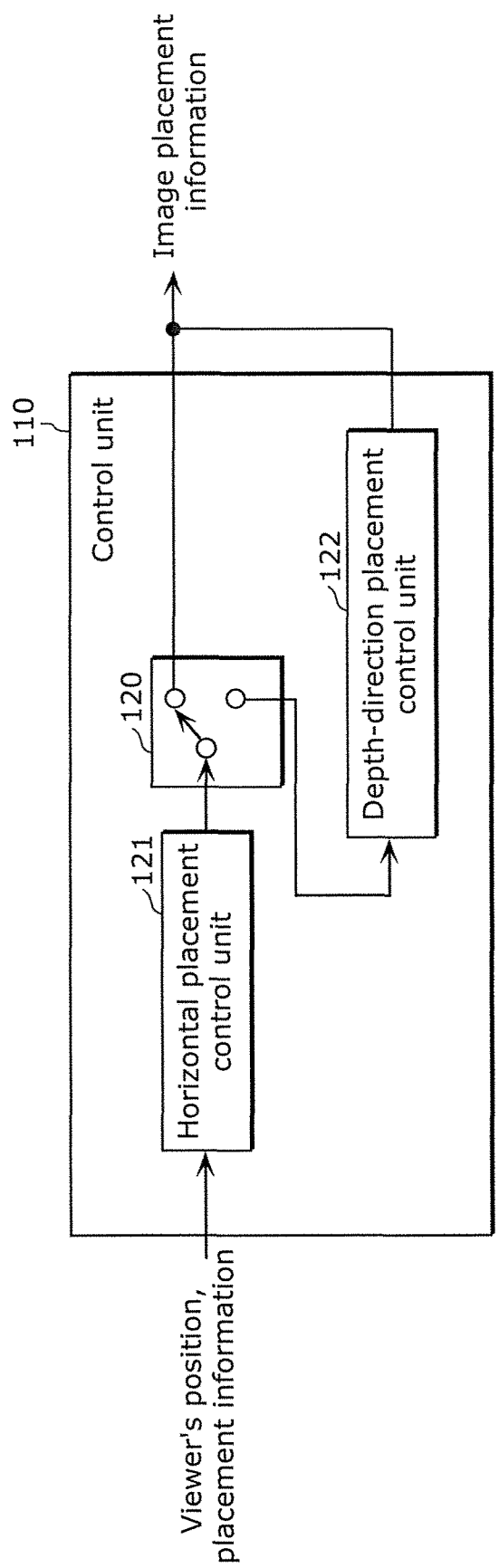
FIG. 3 is a block diagram of a configuration of a control unit.

Next, a configuration of the control unit 110 is described. FIG. 3 is a block diagram of a configuration of the control unit 110. As shown in FIG. 3, the control unit 110, more specifically, includes a signal switching unit 120, a horizontal placement control unit 121, and a depth-direction placement control unit 122.

Figure 4:
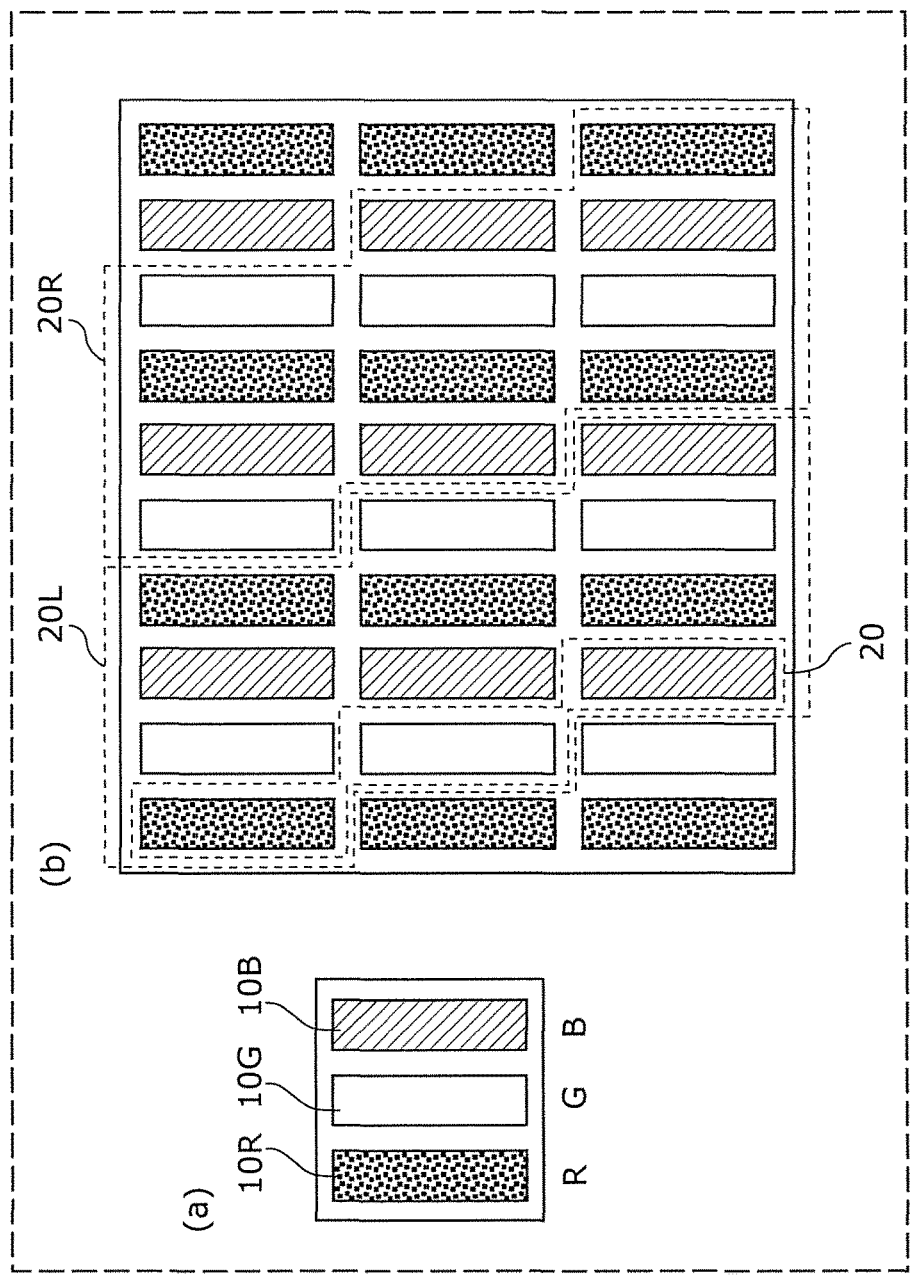
FIG. 4 is a diagram for illustrating structures of a video display unit and a video separation unit.

Here, structures of the video display unit 102 and the video separation unit 101 are to be described. FIG. 4 is a diagram for illustrating the structures of the video display unit 102 and the video separation unit 101.

As shown in (a) of FIG. 4, the video display unit 102 according to the embodiment 1 includes three types of sub-pixels which are a sub-pixel 10R which emits red light, a sub-pixel 10G which emits green light, and a sub-pixel 10B which emits blue light. The sub-pixels are arranged in a matrix.

The video separation unit 101 has a structure of a slanted barrier having an aspect ratio of 3:1. Specifically, as shown in (b) of FIG. 4, one pixel 20 for displaying two disparity images (the left-eye image and the right-eye image) includes three sub-pixels arranged obliquely.

The video display unit 102 displays a video in which the left-eye image and the right-eye image are disposed alternately in units of display each unit made up of four sub-pixels in the horizontal direction. For example, as shown in (b) of FIG. 4, the right-eye image 20R of one unit of display is disposed adjacent to a left-eye image 20L of one unit of display, and this arrangement repeats.

Since the video separation unit 101 has the slanted barrier structure, when the observer moves a little from side to side, a pixel being viewed by the observer and B, G, and R sub-pixels of a pixel next to the pixel being viewed by the observer appear simultaneously. This provides effects which make color moire unlikely to occur and also make the color balance in the pixel being viewed by the observer unlikely to collapse.

Furthermore, since a ratio of a size of the pixel geometry in the horizontal direction to a size of the pixel geometry in the vertical direction is 1:3, if the disparity images are disposed alternately by column of sub-pixels, the aspect ratio of one pixel group of m disparity images is 9:m. In contrast, if the disparity images are disposed alternately by n columns of sub-pixels, the aspect ratio of one pixel group of m disparity images is 9:(n×m). Vertical and horizontal alignment of pixels is well-balanced when n=4 and m=2.

It should be noted that the number of sub-pixels (hereinafter, also simply described as n) in one unit of display in the horizontal direction is not limited to four, and may be two or more sub-pixels. However, as described below, the greater the number of sub-pixels included in each unit of display in the horizontal direction, the more accurately the processing of shifting the disparity images is performed in response to a horizontal movement of the observer positioned at a preferred viewing distance Lc.

In the video display apparatus 100, reducing the percentage of extra sub-pixels seen through the video separation unit 101 (e.g., the percentage of a right-eye image undesirably seen from a position from which a left-eye image next to the right-eye image should be seen) is necessary to reduce cross-talk. Preferably, the value of n is great, also from such a standpoint of reducing cross-talk. From the above and the standpoint of the balance of vertical and horizontal alignment of pixels mentioned above, preferably, n=4 or 5 if m=2 (two disparity images).

[Display of Stereoscopic Video]

Next, operations of the video display apparatus 100, the control unit 110, and the location detecting unit 107 are described.

First, upon initiating video display using the video display apparatus 100 or when the video display apparatus 100 is first installed in a room such as a living room, the initial adjustment unit 103 adjusts the video display unit 102 (a display device) and the video separation unit 101 (the disparity barrier), etc.

If the video separation unit 101 is an active parallax barrier created using a TFT LCD panel or the like, for example, the initial adjustment unit 103 adjusts a barrier pitch bh or a barrier position for a predetermined preferred viewing distance. Specifically, the initial adjustment unit 103 controls the positions of the open portions and blocking portions on a pixel-by-pixel basis or a sub-pixel-by-sub-pixel basis. If the video separation unit 101 is a fixed barrier, the initial adjustment unit 103 uses a predetermined adjustment image to adjust the distance between the video separation unit 101 and the video display unit 102, or adjust a tilt of the barrier.

Together with the initial adjustment by the initial adjustment unit 103, viewability of a stereoscopic video from the preferred viewing distance Lc is evaluated, using a test image. Specifically, tuning of tonal characteristics in the display circuit 105 is performed based on viewability and degrees of blur and fusion.

At this time, depending on the situation, an amount of disparity in disparity image may be controlled (intensity control using linear coefficients, or adjustment in amount of horizontal shift, etc.).

The video display unit 102 displays a video, based on the disparity images 106 obtained through the display circuit 105. The video displayed is separated by the video separation unit 101 so as to be viewed properly by the observer at the predetermined position. This allows the observer to view the left-eye image with the left eye and the right-eye image with the right eye. In other words, the observer can view a stereoscopic video. It should be noted that the disparity images 106 are obtained through various acquisition paths such as broadcasting and communications, and the path is not limited to any particular acquisition path.

The video separation unit 101 has a slanted barrier structure as described with reference to FIG. 4. The barrier pitch bh (the center-to-center distance between adjacent open portions in the horizontal direction) is geometrically determined based on a pitch sh between sub-pixels, the preferred viewing distance Lc, a distance d between the video display unit 102 and the video separation unit 101, and the number m of disparity images. The barrier pitch bh is expressed as Equation (1). Likewise, the preferred viewing distance Lc for an interocular distance E is expressed as Equation (1):

[Math 1]

$$Lc = \frac{E \times d}{sh \times n} \quad (1)$$
$$bh = \frac{m \times E \times (n \times sh)}{E + n \times sh}$$

where m denotes the number of disparity images and n denotes the number of pixels in the horizontal direction included in one unit of display.

The above adjustment made by the initial adjustment unit 103 allows the observer positioned at the preferred viewing distance Lc to properly see the stereoscopic video at predetermined intervals (the interocular distance E). A position obtained from this is to be referred to as a preferred viewing position. It should be noted that the preferred viewing distance Lc refers to a direction perpendicular to a display screen of the video display unit 102, that is, a distance from the video display unit 102 to the observer, and the preferred viewing position refers to the side-to-side direction (the horizontal direction) of the display screen.

By causing the left-eye image to enter the observer's left eye and the right-eye image to enter the right eye, taking the order of the left-eye and right-eye images into account, the observer at the preferred viewing position can view the stereoscopic video.

However, for example, if one of the observer's eyes is off the preferred viewing position, an image in which disparity images are mixed (causing cross-talk) undesirably appear in that eye. In other words, an object appears double or blurred, introducing a phenomenon in which the observer is unable to view the video in a stereoscopic manner.

Thus, in the embodiment 1, the location detecting unit 107 locates the head or the eyes of the observer (hereinafter, also referred to as an audience or a viewer), and display positions of the left-eye image and the right-eye image are varied as a function of the audience's position obtained by the location detecting unit 107, thereby enlarging the viewing zone. Such control over the display positions of the left-eye image and the right-eye image is, hereinafter, also described as disparity-image placement control.

[Location of Viewer]

Figure 5:
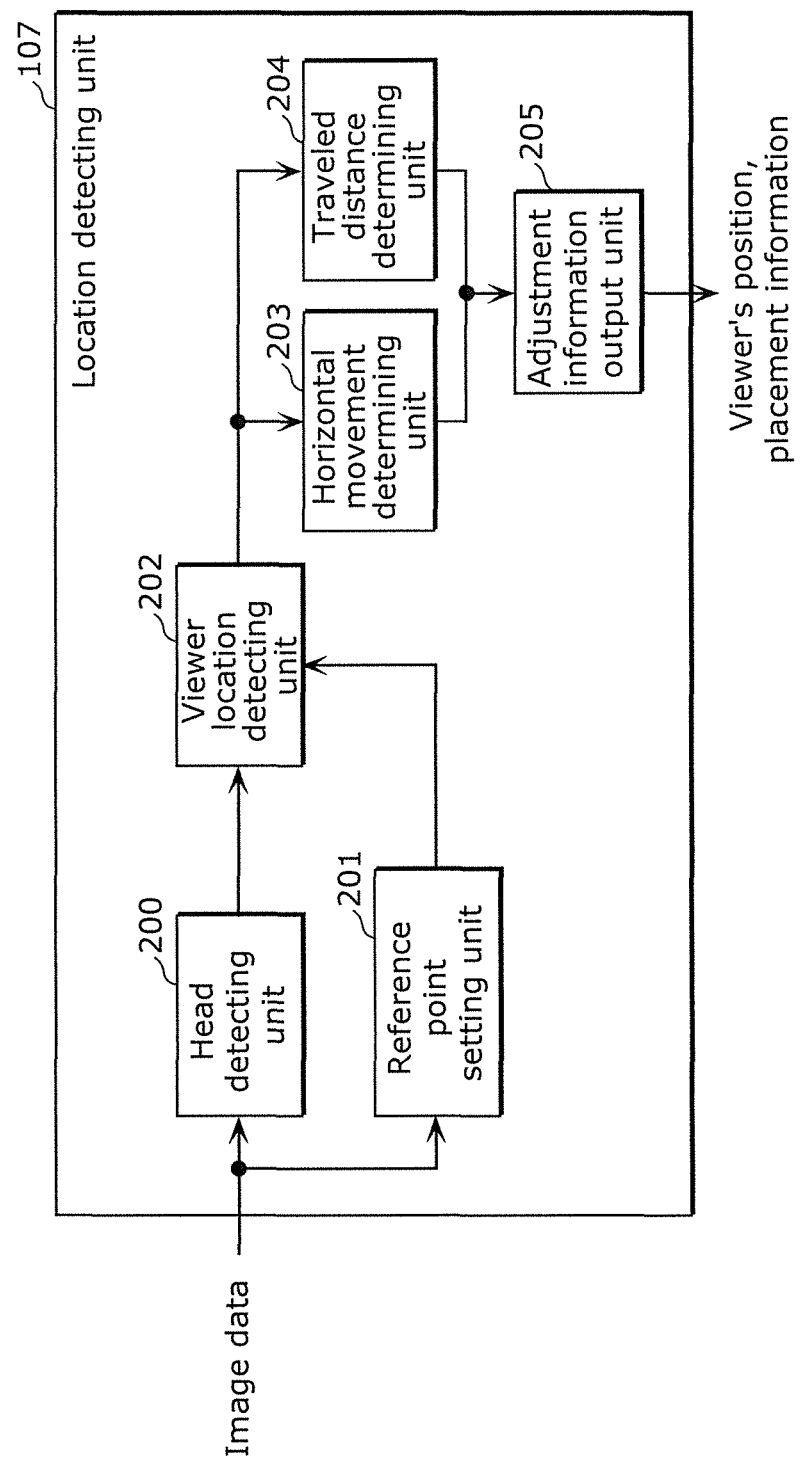
FIG. 5 is a block diagram of a configuration of a location detecting unit.
Figure 6:
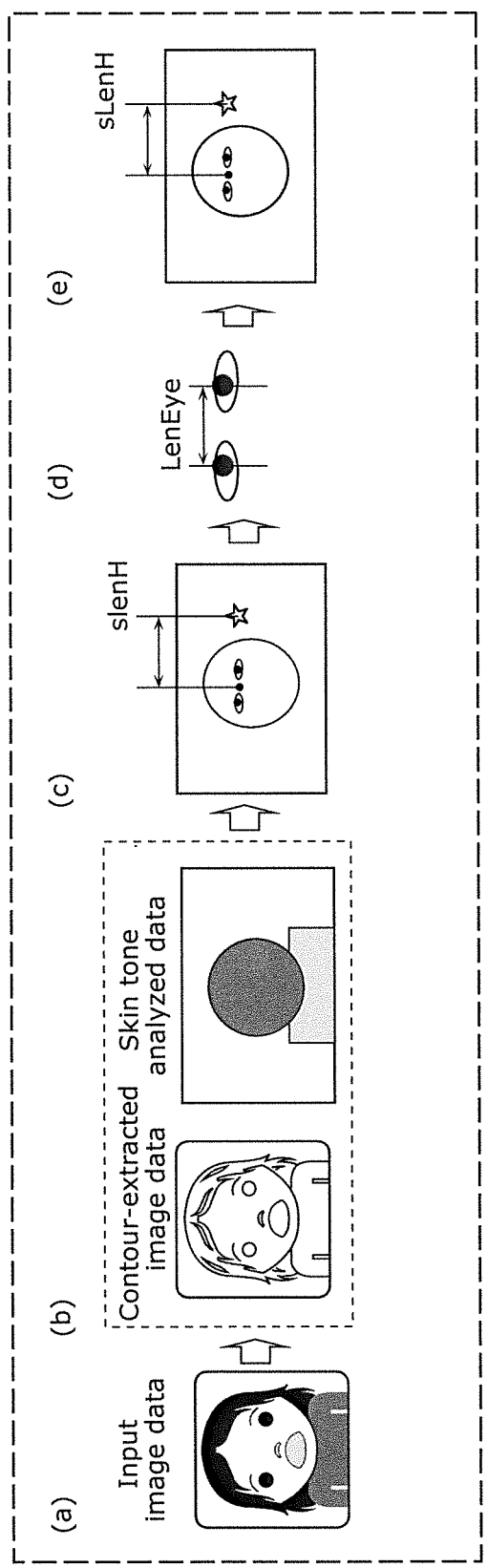
FIG. 6 is a diagram showing an outline of a location process.

The audience is located using the camera 108 and the location detecting unit 107. The camera 108 captures an image of an area where the audience is present. The location detecting unit 107 detects variations in position of the audience, based on the image captured by the camera 108. In the following, location of the audience is to be described, with reference to FIGS. 5 and 6. FIG. 5 is a block diagram of a configuration of the location detecting unit 107. FIG. 6 is a diagram showing an outline of the location process.

As shown in FIG. 5, the location detecting unit 107 includes a head detecting unit 200, a reference point setting unit 201, a viewer location detecting unit 202, a horizontal movement determining unit 203, a traveled distance determining unit 204, and an adjustment information output unit 205. It should be noted that the camera 108 may be included in the location detecting unit 107.

In locating the audience, first, the camera 108 captures an image of an area where the audience is likely to be present. It should be noted that the area an image of which is to be captured here needs to satisfy conditions (e.g., in the case of a living room, a viewing angle from TV is 100 degrees, and a viewing distance is in a range from 1.5 m to 6.7 m, both inclusive) for the angle of view which can be captured by the camera 108.

The head detecting unit 200 extracts the position of the head of a person detected by the camera 108 in the image (input image data, (a) of FIG. 6). From the input image data, contour-extracted image data and skin tone analyzed data are obtained as features ((b) of FIG. 6). The position of the head is extracted based on the features.

Next, the reference point setting unit 201 determines a reference point for use in detecting a relative size of the face in the image ((c) of FIG. 6). The reference point may be set to the center of the image, or to the center position of the face when the right eye is at the preferred viewing position.

Next, as shown in (d) and (e) of FIG. 6, the viewer location detecting unit 202 detects the head of the audience and determines a distance sLenH between the reference point and a center point between the audience's eyes, and an interocular distance LenEye of the audience. A viewing distance Ld is determined, as indicated in Equation (2), by comparing the interocular distance LenEye of the audience to the interocular distance E at the preferred viewing distance Lc. Moreover, a horizontal distance LenH is determined, as indicated in Equation (2), using the number spixEyec of pixels between the audience's eyes and sLenH at the preferred viewing distance Lc in the camera image.

[Math 2]

$$Ld = \frac{Lc \times LenEye}{E} \quad (2)$$

$$LenH = \frac{slenH \times spixEyec}{E}$$

It should be noted that the horizontal movement determining unit 203 may use a reference face image which is prepared and a size of the face in which is known, to determine a correction coefficient by comparing the extracted size of the audience's face with the face in the reference face image, and determine a position of the audience's face in the horizontal direction by multiplying slenH by the correction coefficient. The traveled distance determining unit 204 may determine a distance in the depth direction (the viewing distance Ld) by comparing the extracted size slenFace of the audience's face with the size of the face in the reference face image.

Alternatively, the traveled distance determining unit 204 may pre-measure a distance from a camera view angle to a target and determine the relationship between the distance and each pixel of the camera, to determine a position LenH of the face in the horizontal direction from the number spixH of pixels between the center point in the camera image and the center point between the eyes of the audience, and determine the viewing distance Ld from the number spixEye of pixels between the eyes of the audience.

The horizontal position LenH of the face mentioned above is calculated by the horizontal movement determining unit 203, and the viewing distance Ld is calculated by the traveled distance determining unit 204. Last, the adjustment information output unit 205 outputs a signal for instructing to perform the disparity-image placement control.

Figure 7:
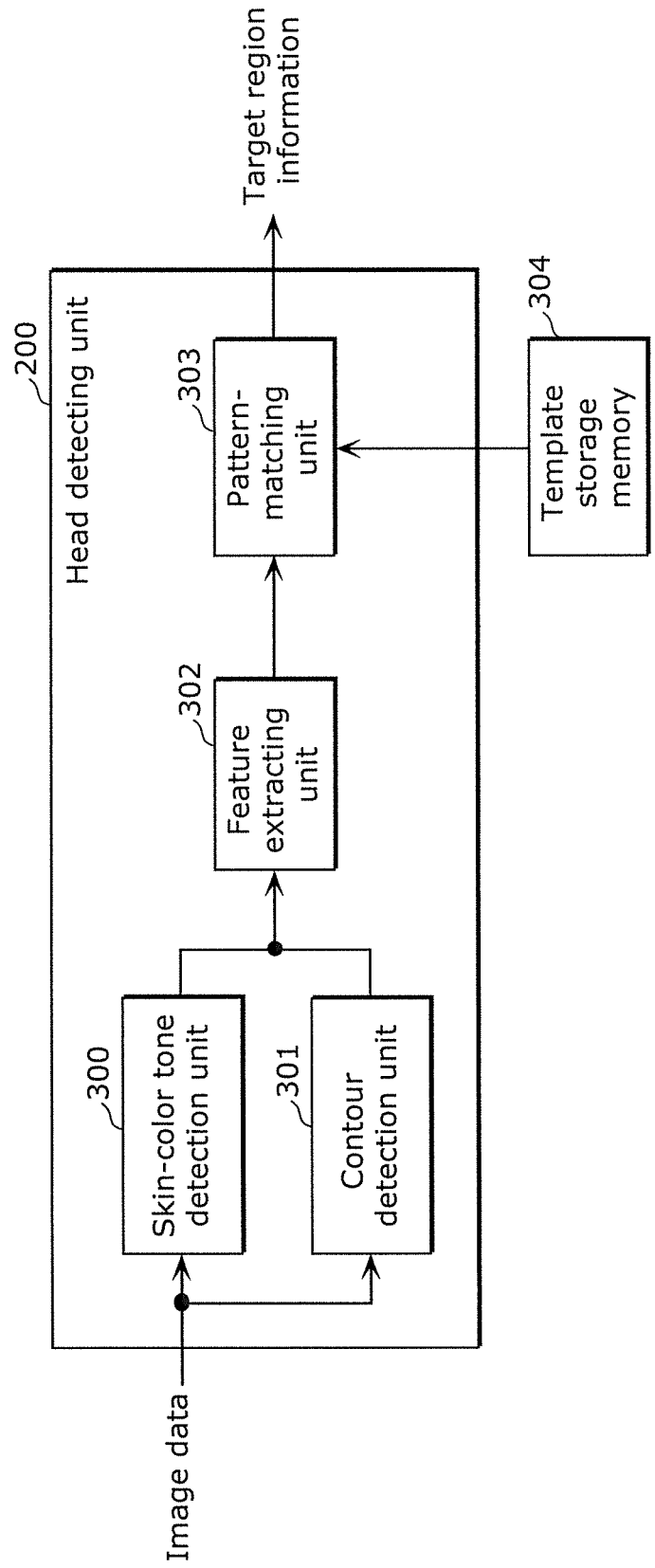
FIG. 7 is a block diagram of a configuration of a head detecting unit.
Figure 8:
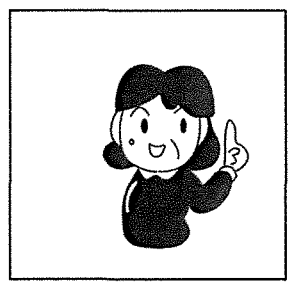
FIG. 8 is a schematic view for illustrating an example of pattern matching.
Figure 8:
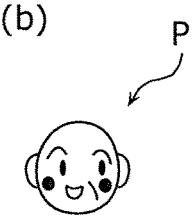
Figure 8:
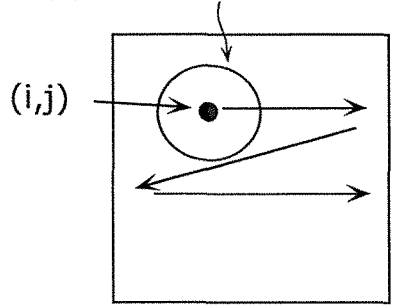

Next, the head detection is to be described in detail, with reference to FIGS. 7 and 8. FIG. 7 is a block diagram of a configuration of the head detecting unit 200. FIG. 8 is a schematic view for illustrating an example of pattern matching process.

As shown in FIG. 7, the head detecting unit 200 includes a skin-color tone detection unit 300, a contour detection unit 301, a feature extracting unit 302, a pattern-matching unit 303, and a template storage memory 304.

It should be noted that the template storage memory 304 may be provided external to the head detecting unit 200, or may be included in the head detecting unit 200. The template storage memory 304 is, specifically, a recording medium, such as a hard disk and a semiconductor memory.

The contour detection unit 301 obtains contour information from the input image data (a color image signal, (a) of FIG. 8). Processing performed by the contour detection unit 301 is to be described in detail below.

The contour detection unit 301 performs two-dimensional filtering using a two-dimensional filter of 3 by 3 matrix as indicated in Equation (3), to determine, by Equation (4), a derivative vector vd (i, j) (xd (i, j), yd (i, j)) of each pixel (i, j) in the image.

The contour detection unit 301 also determines a magnitude stv (i, j) of the derivative vector vd (i, j) by an equation: stv(i,j)=(xd(i,j)×xd(i,j)+yd(i,j)×yd(i,j))^0.5. Here, x^0.5 corresponds to the square root of x. It should be noted that the equation may be stv(i,j)=|xd(i,j)|+|yd(i,j)|.

[Math 3]

$$fx = \begin{bmatrix} fx_{00} & fx_{10} & fx_{20} \\ fx_{01} & fx_{11} & fx_{21} \\ fx_{02} & fx_{12} & fx_{22} \end{bmatrix} = \begin{bmatrix} -1 & 0 & 1 \\ -2 & 0 & 2 \\ -1 & 0 & 1 \end{bmatrix} \quad (3)$$

$$fy = \begin{bmatrix} fy_{00} & fy_{10} & fy_{20} \\ fy_{01} & fy_{11} & fy_{21} \\ fy_{02} & fy_{12} & fy_{22} \end{bmatrix} = \begin{bmatrix} -1 & -2 & -1 \\ 0 & 0 & 0 \\ 1 & 2 & 1 \end{bmatrix}$$

[Math 4]

$$xd(i, j) = \sum_{n=-1}^{1} \sum_{m=-1}^{1} fx_{n+1\,m+1} \cdot k(i-n, j-m) \quad (4)$$

$$yd(i, j) = \sum_{n=-1}^{1} \sum_{m=-1}^{1} fy_{n+1\,m+1} \cdot k(i-n, j-m)$$

The contour detection unit 301 compares stv (i, j) of each pixel (i, j) with a predetermined threshold TH2 as indicated in Equation (5), to extract contour pixels. It should be noted that Equation (5) is for binarizing each pixel on the image formed of a color image signal, to indicate whether the pixel is one of those included in the contour or not. E (i, j)=1 indicates that the pixel (i, j) is included in the contour.

[Math 5]

$$E(i, j) = \begin{bmatrix} 1 & \text{if } (stv(i, j) \geq TH2) \\ 0 & \text{if } (stv(i, j) < TH2) \end{bmatrix} \quad (5)$$

The contour information E (i, j) (hereinafter, may also simply referred to as "contour information Eij".) determined in such a manner by the contour detection unit 301 is output to the feature extracting unit 302.

Meanwhile, the skin-color tone detection unit 300 classifies the input image data into clusters based on color distribution, and calculates a skin color tone depicted by pixels in each cluster. The skin-color tone detection unit 300 then determines likelihood of skin color which is information obtained by converting the cluster regions such that a cluster region which includes a larger number of pixels representing higher likelihood of skin colors outputs a value closer to 1.0.

The feature extracting unit 302 determines a human-likeness FH (i, j) of each pixel, based on two features which are the contour information and the likelihood of skin color. The human-likeness FH (i, j) of each pixel may be calculated through a linear combination of the two features or a nonlinear transformation using the two features. If the contour information E (i, j) indicates high likelihood of skin color, the feature extracting unit 302 may output E (i, j) directly as the human-likeness FH (i, j) of the pixel. If the contour information E (i, j) indicates low likelihood of skin color, the feature extracting unit 302 may multiply the contour information E (i, j) by a coefficient for yielding reduced contour information E (i, j), and output resultant contour information E (i, j) as the human-likeness FH (i, j) of the pixel. Alternatively, the feature extracting unit 302 may determine the human-likeness FH (i, j) of the pixel, based on the contour information E (i, j), without the use of the likelihood of skin color.

The pattern-matching unit 303 extracts a target region through pattern matching processing using the human-likeness FH (i, j) of the pixel obtained by the feature extracting unit 302 and prepared geometry data, in the template storage memory 304, for the target region. Examples of the target region to be extracted include a face region, a person region (upper body, full body), and face part regions such as eye regions, a nose region, and a mouth region.

For the case where the target region is a face region, the template storage memory 304 holds (stores) standardized geometry data (may be plural or may be geometry data in more than one orientation.) for face region. For the case where the target region is a person region, the template storage memory 304 holds the standardized geometry data (may be plural, may be geometry data in more than one orientation, or may be the upper body or the full body.) for person region. For the case where the target region is a face part region such as eye regions, a nose region, and a mouth region, the template storage memory 304 holds the standardized geometry data for each face part region ((b) of FIG. 8).

The pattern matching process scans a point (i, j) which is the center point of Tp[k, s] ((c) of FIG. 8). The pattern matching process is performed in this way using geometry data Tp[k, s] (p=1, . . . , Pnum) (k=0, 1, . . . , Wp−1) (s=0, 1, . . . , Hp−1) held in the template storage memory 304 and the human-likeness FH (i, j) of each pixel (i, j), thereby extracting the target region (target region information), where Pnum represents the number of templates, and Wp and Hp respectively represent the number of horizontal pixels and the number of vertical pixels of a rectangular template.

While there are many pattern matching process approaches performed by the pattern-matching unit 303, a simplified way is as follows.

First, in a template p, a candidate rectangular region SR[i, j, Wp, Hp], where Wp represents the horizontal width passing through the pixel (i, j) as the center point and Hp represents the vertical width passing through the pixel (i, j) as the center point, is determined.

The pattern-matching unit 303 then determines an evaluation function R (i, j, p) as expressed in Equation (6), based on the contour information E (i, j) in the candidate rectangular region SR[i, j, Wp, Hp], and the geometry data Tp[k, s] ((k=0, Wp−1) (s=0, 1, . . . , Hp−1)) held in the template storage memory 304.

[Math 6]

$$R(i, j, p) = \sum_{k=0}^{Wp-1} \sum_{s=0}^{Hp-1} Tp[k, s] \cdot E(i - Wp/2 + k, j - Hp/2 + s) \quad (6)$$

Next, as indicated in Equation (7), the pattern-matching unit 303 determines MR which is a maximum evaluation function R (i, j, p) for the template p and the pixel (i, j). In Equation (7), max indicates that maximum of R (i, j, p) for the pixel (i, j) and the template p is to be determined. If the maximum MR is greater than or equal to a predetermined threshold THMR, the pattern-matching unit 303 extracts, as target region information BestSR[i, j, W, H], a candidate rectangular region SR[i, j, Wp, Hp] corresponding to the maximum MR.

[Math 7]

$$BestSR(i, j, W, H) = \{SR[i, j, Wp, Hp] \mid MR = \max_{(i,j),p}\{R(i, j, p)\}, MR \geq THMR\} \quad (7)$$

The pattern-matching unit 303 compares the maximum MR to the predetermined threshold THMR in this manner, thereby reducing chances that the matching is made with noise, for example. If the maximum MR is less than the predetermined threshold THMR, the pattern-matching unit 303 determines that there is no target region, and outputs information [width/2, height/2, width, height] of the input image data as the target region information BestSR[i, j, W, H]. The "width" as used refers to the number of horizontal pixels of the input image data. The "height" as used refers to the number of vertical pixels of the input image data.

In this manner, the head detecting unit 200 outputs the target region information BestSR[i, j, W, H] obtained by the pattern-matching unit 303.

[Disparity-Image Placement Control]

Figure 9:
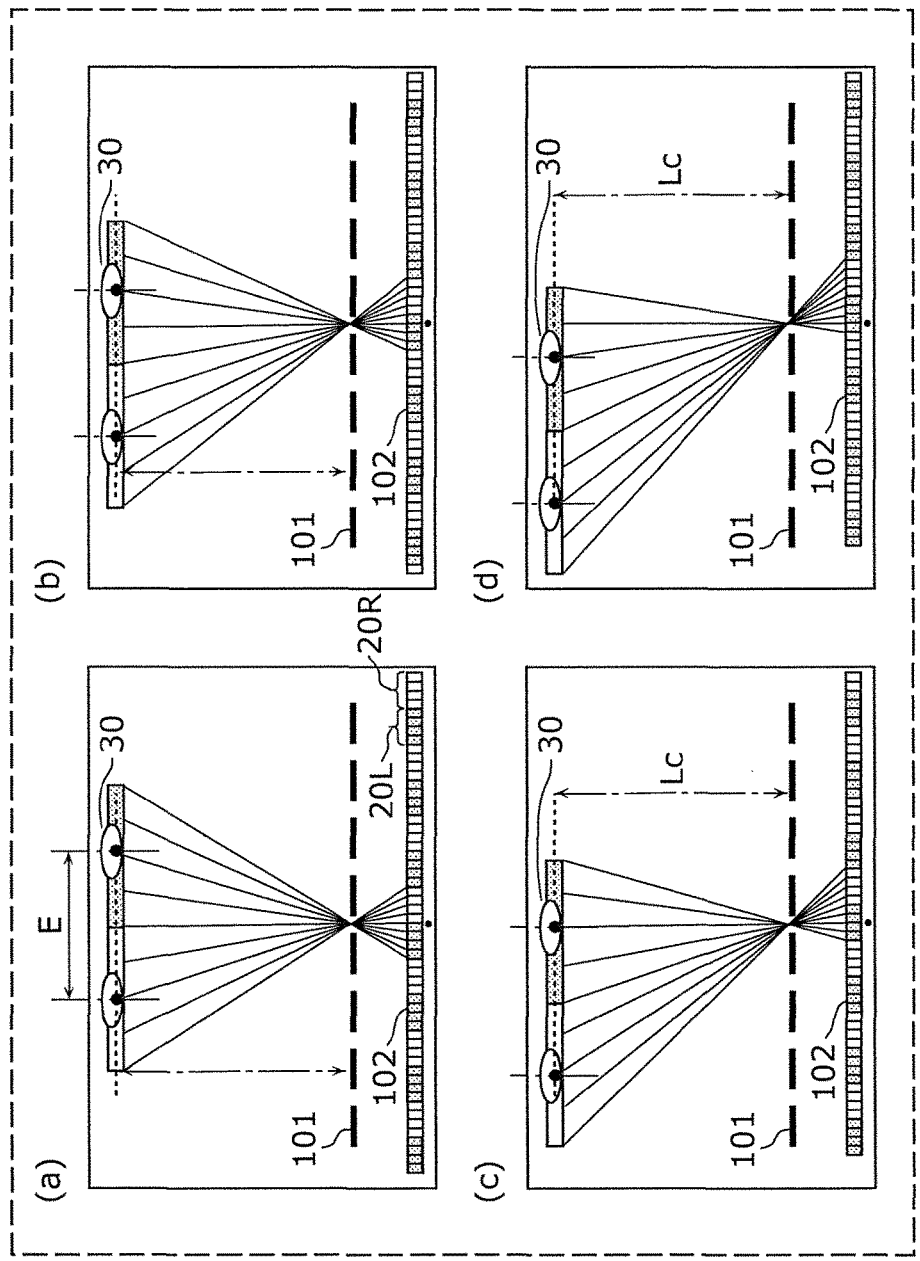
FIG. 9 is a diagram for illustrating disparity-image placement control provided when an observer positioned at a preferred viewing distance Lc moves horizontally.
Figure 10:
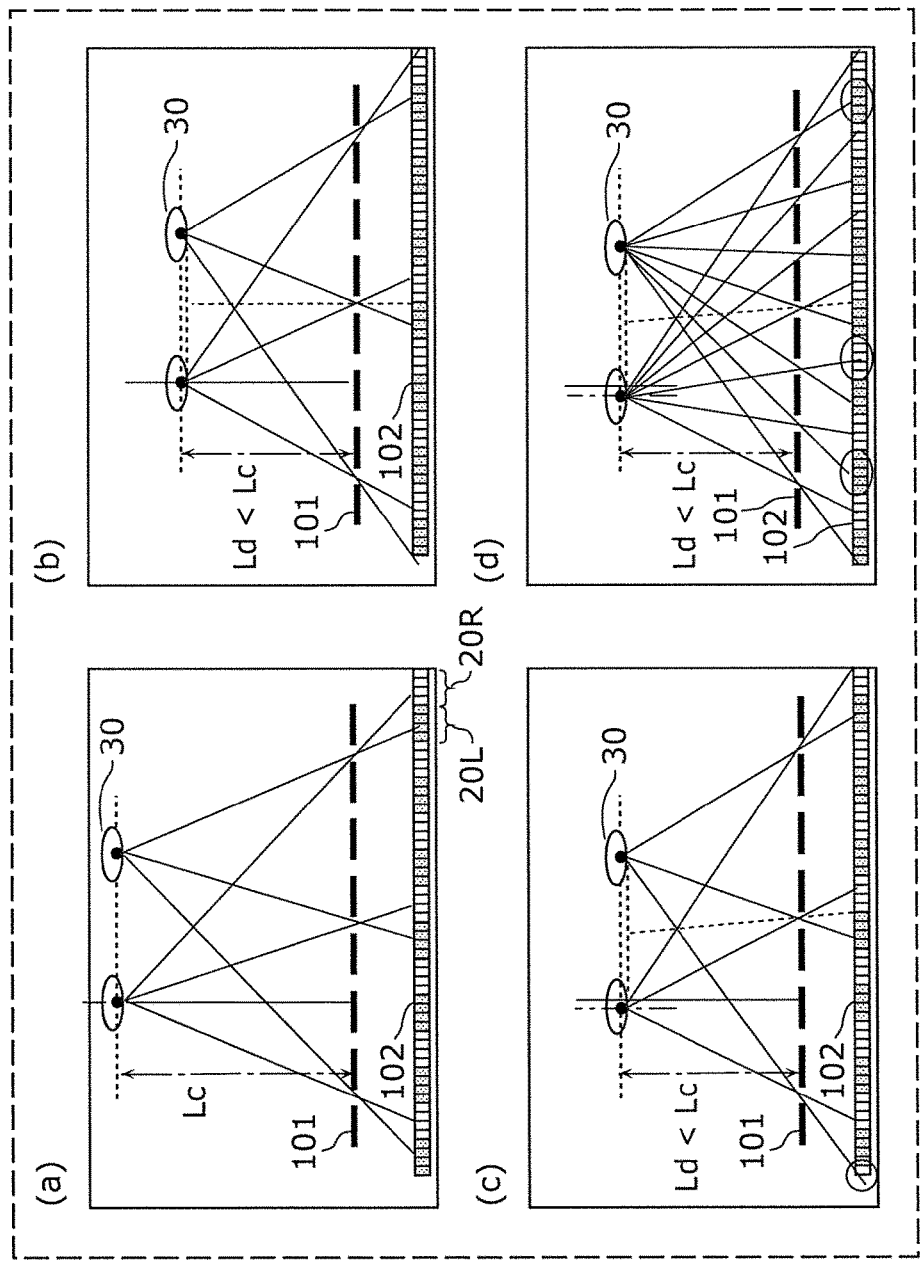
FIG. 10 is a first figure for illustrating the placement control provided when the observer positioned at a distance Ld different from the preferred viewing distance Lc moves horizontally.
Figure 11:
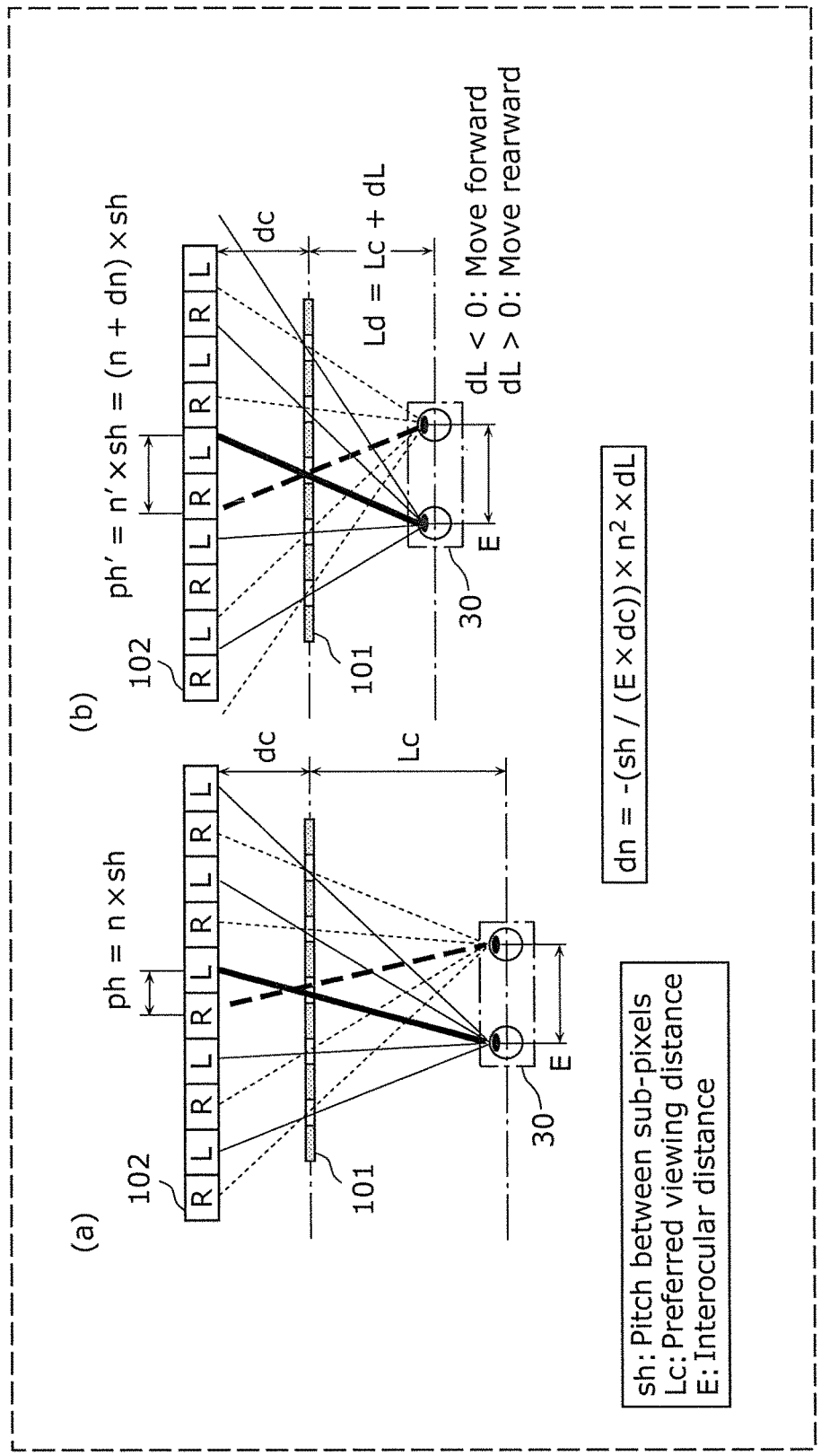
FIG. 11 is a second figure for illustrating the placement control provided when the observer positioned at the distance Ld different from the preferred viewing distance Lc moves horizontally.

If the location detecting unit 107 outputs signals indicating the horizontal direction (the side-to-side direction) and a range direction (the distance from the video display apparatus 100 to the audience), the control unit 110 controls placement of the disparity images to be displayed on the video display unit 102. Such placement control is a feature of the video display apparatus 100. The disparity-image placement control is described below, with reference to FIGS. 9 through 11. FIG. 9 is a diagram for illustrating the disparity-image placement control provided when an observer positioned at a preferred viewing distance Lc moves horizontally. FIGS. 10 and 11 are diagrams for illustrating the disparity-image placement control provided when the observer positioned at the distance Ld different from the preferred viewing distance Lc moves horizontally. Referring to FIGS. 9 through 11, the case is described where the number m of disparity images is equal to 2, the number n of sub-pixels (a unit of display), which are included in each of the disparity images alternately disposed, is equal to 4. In the description with reference to FIG. 11, the integer n changes to a real number n', depending on a viewing distance. In this case, n' corresponds to an average number of sub-pixels.

Part (a) of FIG. 9 schematically shows the observer 30 positioned at the preferred viewing position at the preferred viewing distance Lc. The preferred viewing position as used herein refers to a position at which the observer can clearly, separately view the disparity images, which position is arranged at every interocular distance E as mentioned above.

If it is detected that the position of the observer 30 has moved in the horizontal direction from the state shown in (a) of FIG. 9, the horizontal placement control unit 121 of the control unit 110 shifts the display position of the video in response of an amount Δhn of movement of the position of the observer as indicated in Equation (8).

[Math 8]

$$\Delta hn = \frac{E}{n} \quad (8)$$

Specifically, the horizontal placement control unit 121 shifts the video (the left-eye image 20L and the right-eye image 20R) by one sub-pixel each in a direction opposite to a direction in which the head of the observer 30 has moved, and displays the video, thereby expanding the viewing zone in the horizontal direction. For example, if the head of the observer 30 has moved by E/n from the preferred viewing position to the right as seen by the observer 30, the horizontal placement control unit 121 moves the image by one sub-pixel to the left.

Specifically, as shown in (b), (c), and (d) of FIG. 9, if the head of the observer 30 viewing the screen moves to the right from the preferred viewing position by E/4, E×2/4, and E×3/4, the horizontal placement control unit 121 shifts the video by one sub-pixel, two sub-pixels, and three sub-pixels, respectively. The dot below the video display unit 102 in each figure of FIG. 9 indicates the center of the disparity images when the observer is at the preferred viewing position in (a) of FIG. 9.

If the observer 30 moves by a distance E/n=E/4 when n=4 as such, the display position of the video is shifted, by one sub-pixel, in a direction opposite to the direction in which the head of the observer 30 has moved. In the other words, the video display apparatus 100 can follow the movement, by E/4 (a shift unit) of the interocular distance, of the head of the observer 30, allowing the observer 30 to view the stereoscopic video in which cross-talk is reduced. It should be noted that as shown in the examples of FIG. 9, if the observer 30 moves horizontally only while keeping the preferred viewing distance Lc, processing by the depth-direction placement control unit 122 is not performed.

In contrast, FIG. 10 schematically illustrates the observer 30 positioned at a preferred viewing position at the distance Ld different from the preferred viewing distance Lc. Part (a) of FIG. 10 illustrates the observer 30 viewing the video in front of the display screen (the preferred viewing position) at the preferred viewing distance Lc. Part (b) of FIG. 10 illustrates the observer 30 viewing the video in front of the display screen at the viewing distance Ld that is closer to the display screen than the preferred viewing distance Lc is.

Unlike (a) of FIG. 10, in (b) of FIG. 10, the phantom lines extending from the eyes to the video display unit 102 are undesirably deviated. Thus, if the observer 30 is viewing the video at the viewing distance Ld different from the preferred viewing distance Lc and moves by Δhnd, the horizontal placement control unit 121 shifts the display position of the video by one sub-pixel in a direction opposite to the direction in which the head of the observer 30 has moved. It should be noted that Δhnd is a corrected version of Δhn, which is determined by Equation (9) based on the relationship between Lc and Ld.

[Math 9]

$$\Delta hnd = \Delta hn \times \frac{Ld}{Lc} \quad (9)$$

Unfortunately, even though the horizontal placement control unit 121 provides such control, as shown in (c) of FIG. 10, if the observer 30 viewing the screen moves to the right, the observer 30 may not correctly view the video at a screen edge (the right end of the screen as seen by the observer 30 in the example of (c) in FIG. 10). In other words, the right-eye image may undesirably appear in the left eye of the observer 30. Even if the observer 30 is in front of the video display apparatus 100, such a negative effect occurs when the observer 30 is at a distance closer to the display screen than the preferred viewing distance Lc or when the observer 30 is farther away from the display screen than the preferred viewing distance Lc.

Thus, in the embodiment 1, in order to mitigate the negative effects, the depth-direction placement control unit 122 varies the number n of sub-pixels of at least one unit of display among the units of display, as shown in (d) of FIG. 10, in addition to the horizontal placement control unit 121 shifting the video. In the other words, the depth-direction placement control unit 122 varies an average number n' of sub-pixels included in the units of display. Specifically, in (c) of FIG. 10, the number n of sub-pixels included in each unit of display enclosed by the ellipses is changed from 4 to 5.

Such placement control (how the number n of sub-pixels included in at least one unit of display is varied) is to be described in detail, with reference to FIG. 11. As the observer 30 at the preferred viewing distance Lc moves to the viewing distance Ld, a proper pitch between the units of display varies from ph to ph' as indicated in Equation (10). If Ld<Lc, an amount dL of variation in distance is less than 0, an amount do of variation in number of sub-pixels is greater than 0 from Equation (10). In short, control to increase an average pitch between the units of display is required to adapt the forward movement of the observer 30 (toward the video display apparatus 100).

[Math 10]

$$ph' = n' \times sh = (n + dn) \times sh \qquad (10)$$
$$dn = -\frac{sh}{E \times dc} \times n^2 \times dL$$

The number n' of sub-pixels is a real number. The pitch between the units of display is not fixed but is an average value of the pitches between the units of display. Thus, the depth-direction placement control unit 122 varies the number n of sub-pixels of at least one unit of display among the units of display so that the units of display have an average pitch of n'. For example, in the case where n=4 for the video viewing at the preferred viewing distance Lc, the average pitch n'=4.2 for the video viewing at the viewing distance Ld can be achieved by repeating, starting from an absolute center position (of the video display unit 102) to the screen edges, a basic unit, consisting of four units of display each unit made up of four sub-pixels and one unit of display made up of five sub-pixels.

If the observer 30 is away from the display screen farther than the preferred viewing distance Lc, control to narrow the average pitch between the units of display is necessary, in which case control to reduce the number of sub-pixels of at least one unit of display among the units of display is performed.

The number of sub-pixels may be varied in any way insofar as the average pitch n' is achieved. For example, the basic unit may be repeated starting with a sub-pixel at a position corresponding to the current center position between the eyes of the observer 30 to the screen edges. Alternatively, the number n of sup-pixels of at least one unit of display near a region in front of the head position of the observer 30 may be unchanged and the number n of sup-pixels of at least one unit of display farther away therefrom may be increased or reduced.

[Summary]

Figure 12:
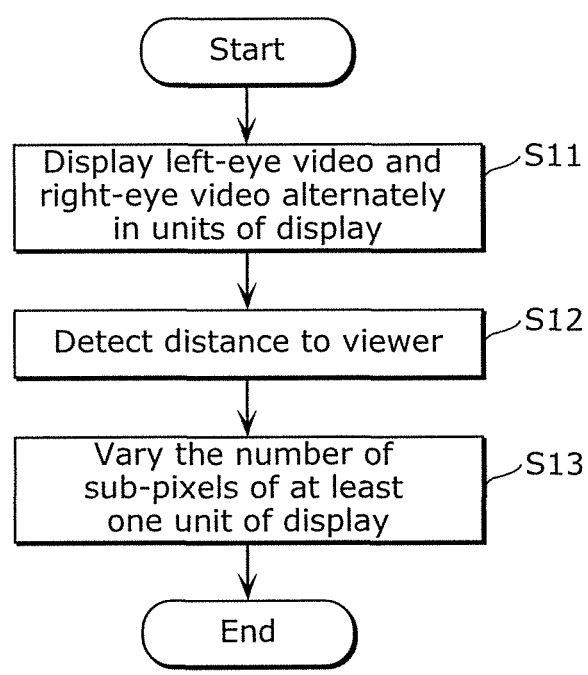
FIG. 12 is a flowchart illustrating operation of the video display apparatus according to the embodiment 1.

Operation (a video display method) of the above-described video display apparatus 100 is to be briefly summarized, with reference to a flowchart. FIG. 12 is a flowchart illustrating operation of the video display apparatus 100.

The video display method illustrated in FIG. 12 is a video display method using the video display apparatus 100 for displaying glasses free 3D videos. The video display apparatus 100 includes the video display unit 102 in which sub-pixels constituting pixels are arranged in a matrix.

First, the control unit 110 of the video display apparatus 100 displays a video in which the left-eye video and the right-eye video are disposed alternately in units of display each unit made up of n (n is an integer equal to or greater than 2) sub-pixels in a row of sub-pixels of the video display unit 102 (S11). The row of sub-pixels refers to alignment of sub-pixels in the row direction of the video display unit 102. In the above embodiment 1, n=4.

Next, the location detecting unit 107 detects the viewing distance Ld which is a distance from the video display unit 102 to the viewer (the observer) (S12). The viewing distance Ld as used herein is, more specifically, the distance from the video display apparatus 100 to the viewer (the observer) in the direction perpendicular to the display screen of the video display unit 102.

Then, if the viewing distance Ld detected is different from the preferred viewing distance Lc which is a predetermined distance, the control unit 110 varies the number of sub-pixels of at least one unit of display among the units of display included in the row of sub-pixels, as a function of the detected distance (S13).

Specifically, the control unit 110 increases the number of sub-pixels of the at least one unit of display among the units of display if the detected viewing distance Ld is less than the preferred viewing distance Lc, and reduces the number of sub-pixels of the at least one unit of display if the detected viewing distance Ld is greater than the preferred viewing distance Lc.

This can relax viewing zone constraints on the viewer's movement in the front-rear direction. In other words, this can expand the range where the viewer can properly view the 3D video, and display the glasses free 3D video, following changes in viewing position of the viewer. In such a video display method, an interpolated image is not generated nor displayed. Thus, cross-talk and blur due to interpolation can be reduced.

Preferably the number n of sub-pixels is an integer equal to or greater than 4 because this allows a video to be displayed, more smoothly following the horizontal movement of the audience, since the display position of the video is shifted by one sub-pixel as the audience moves by E/n in the horizontal direction (the lateral direction).

If the viewing distance Ld when the audience is in front of the video display unit 102 is different from the preferred viewing distance Lc, the disparity images closer to the screen edges are more likely to cause cross-talk. Thus, the control unit 110 may provide control such that the units of display that are closer to the display edges include a greater number of sub-pixels. In other words, the at least one unit of display, having sub-pixels the number of which is to be increased, may include a unit of display that is at an end of the row of sub-pixels among the plurality of units of display included in the row, and the at least one unit of display, having sub-pixels the number of which is to be reduced, may include a unit of display that is in a middle of the row of sub-pixels among the plurality of units of display included in the row.

It should be noted that the preferred viewing distance Lc (the predetermined distance) mentioned above may have a range, in which case, the number of sub-pixels of the at least one unit of display is increased or reduced if the viewing distance Ld detected is outside the range.

[Variation]

Figure 13:
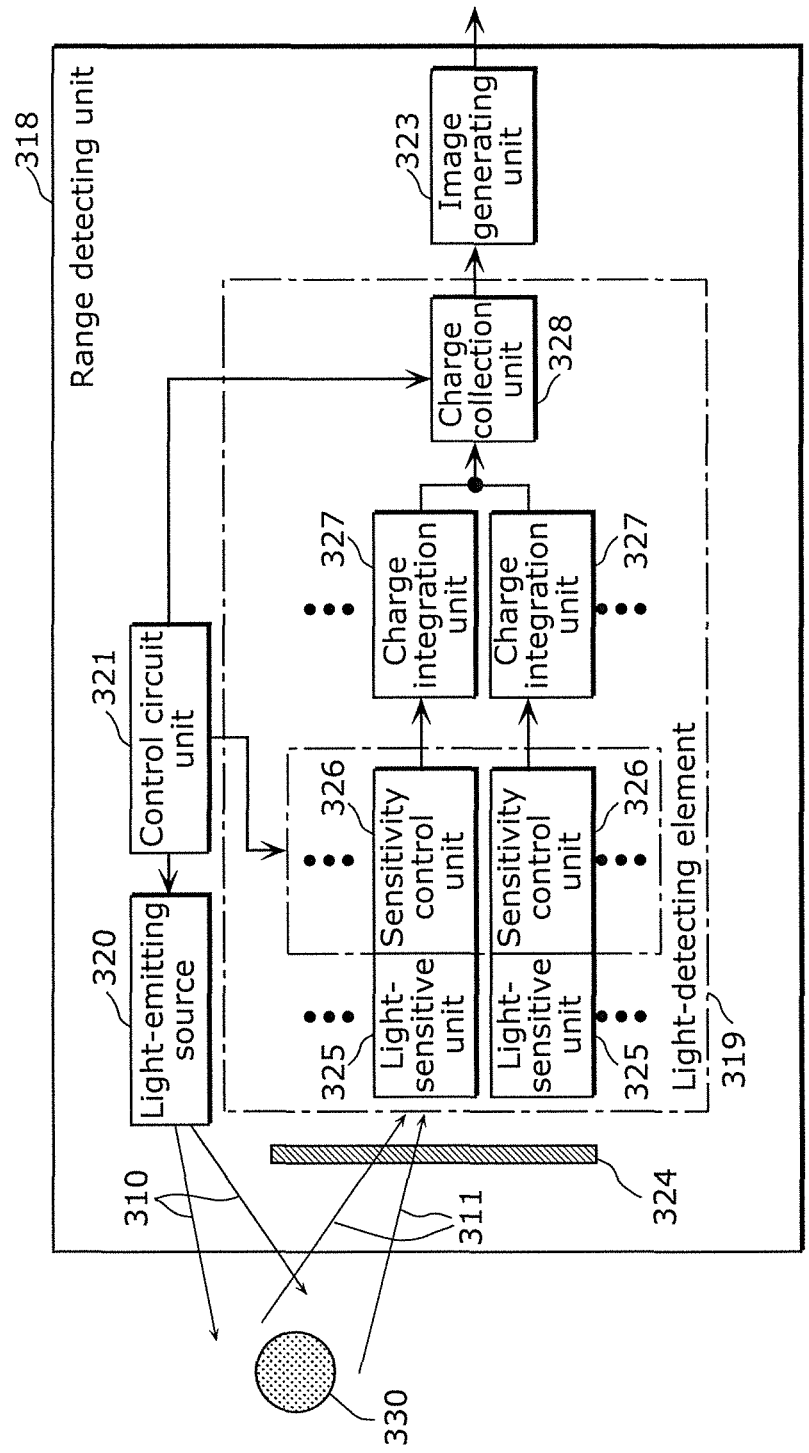
FIG. 13 is a block diagram of a configuration of a range detecting unit.
Figure 14:
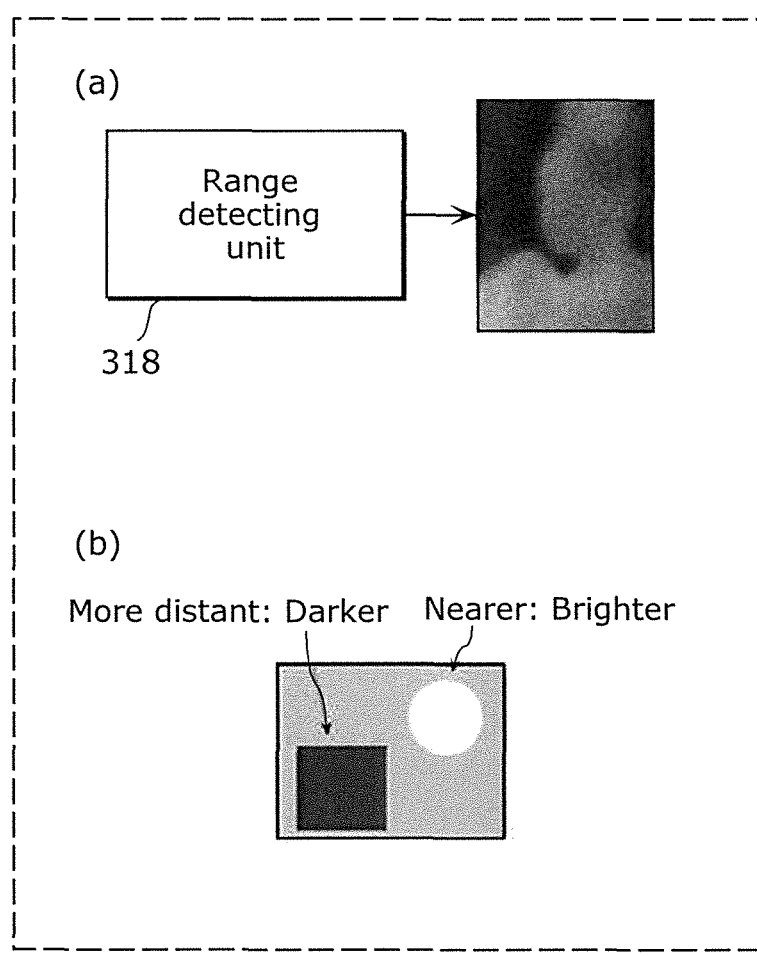
FIG. 14 is a diagram for illustrating operation of the range detecting unit.

While the example of locating the viewer using the location detecting unit 107 and the camera 108 has been described in the embodiment 1, the viewer may be located in any way. For example, the range detecting unit shown in FIGS. 13 and 14 may be used as the location detecting unit 107. FIG. 13 is a block diagram of a configuration of the range detecting unit. FIG. 14 is a diagram for illustrating operation of the range detecting unit.

A range detecting unit 318 shown in FIGS. 13 and 14 corresponds to a distance measuring device. For the distance detection by the range detecting unit 318, TOF is employed in which a time of flight (TOF) is measured which is from a time when illumination light is emitted onto a target object to when the illumination light returns.

As shown in FIG. 13, the range detecting unit 318 includes a light-emitting source 320 and a light-detecting element 319. The light-emitting source 320 emits illumination light 310 to a target space (an object 330). The light-detecting element 319 receives reflected light 311 from the target space through a lens 324, and outputs an electric signal of an output value reflecting the received amount of light. The range detecting unit 318 includes a control circuit unit 321 and an image generating unit 323. The control circuit unit 321 provides control over the light-emitting source 320 and the light-detecting element 319. The image generating unit 323 generates an image in response to the output from the light-detecting element 319.

The range detecting unit 318 includes the light-detecting element 319. The light-detecting element 319 includes a plurality of light-sensitive units 325, a plurality of sensitivity control units 326, a plurality of charge integration units 327, and a charge collection unit 328.

The light-emitting source 320 emits, to the target space, light modulated by a modulation signal having a predetermined period, and the light-detecting element 319 images the target space.

The image generating unit 323 determines a distance from the range detecting unit 318 to an object OBJ based on a phase difference between the light emitted from the light-emitting source 320 to the target space and the reflected light which is from the object OBJ in the target space and received by the light-detecting element 319.

A light-receiving period during which the light-sensitive units 325 of the light-detecting element 319 receive light from the target space is controlled by the control circuit unit 321. The light-sensitive units 325 receive the light during the light-receiving period controlled so as to synchronize with a phase which differs from that of the modulation signal.

The image generating unit 323 receives from the light-detecting element 319 the charge integrated for each detection period equal to or greater than one period of the modulation signal. The image generating unit 323 converts amounts of charge obtained during the plurality of detection periods into an amount of charge added up for each light-receiving period, to obtain a distance image.

As a result, as shown in (a) of FIG. 14, the range detecting unit 318 yields a grayscale image. In the grayscale image (the distance image), for example, a more distant object is displayed by darker shading, whereas a nearer object is displayed by brighter shading, as shown in (b) of FIG. 14.

A person can be located in the image by extracting the person based on object shape estimate and determining a distance from the range detecting unit 318 to the person.

Embodiment 2

In the embodiment 2, a video display apparatus which has functionality of detecting a viewing direction of an observer is described. Such a video display apparatus changes the number n of sub-pixels of at least one unit of display among units of display, based on, in addition to a measured viewing distance of the observer to the display apparatus, the viewing direction of the observer. This expands a viewing zone when the observer moves in a depth direction (the front-rear direction). In the embodiment 2 below, difference from the embodiment 1 is mainly described and description already set forth in the embodiment 1 may be omitted.

[Configuration]

Figure 15:
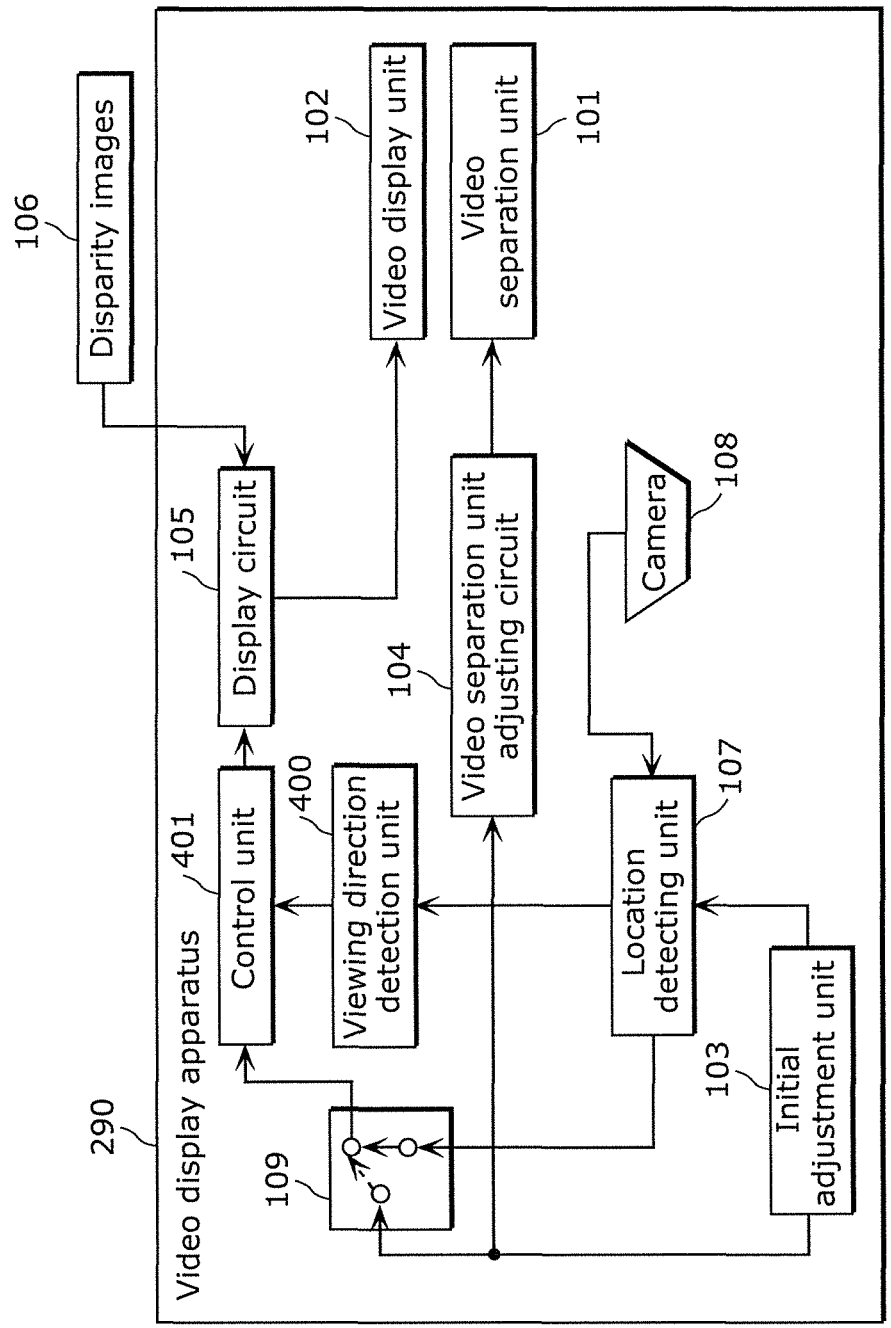
FIG. 15 is a block diagram of a configuration of a video display apparatus according to an embodiment 2.
Figure 16:
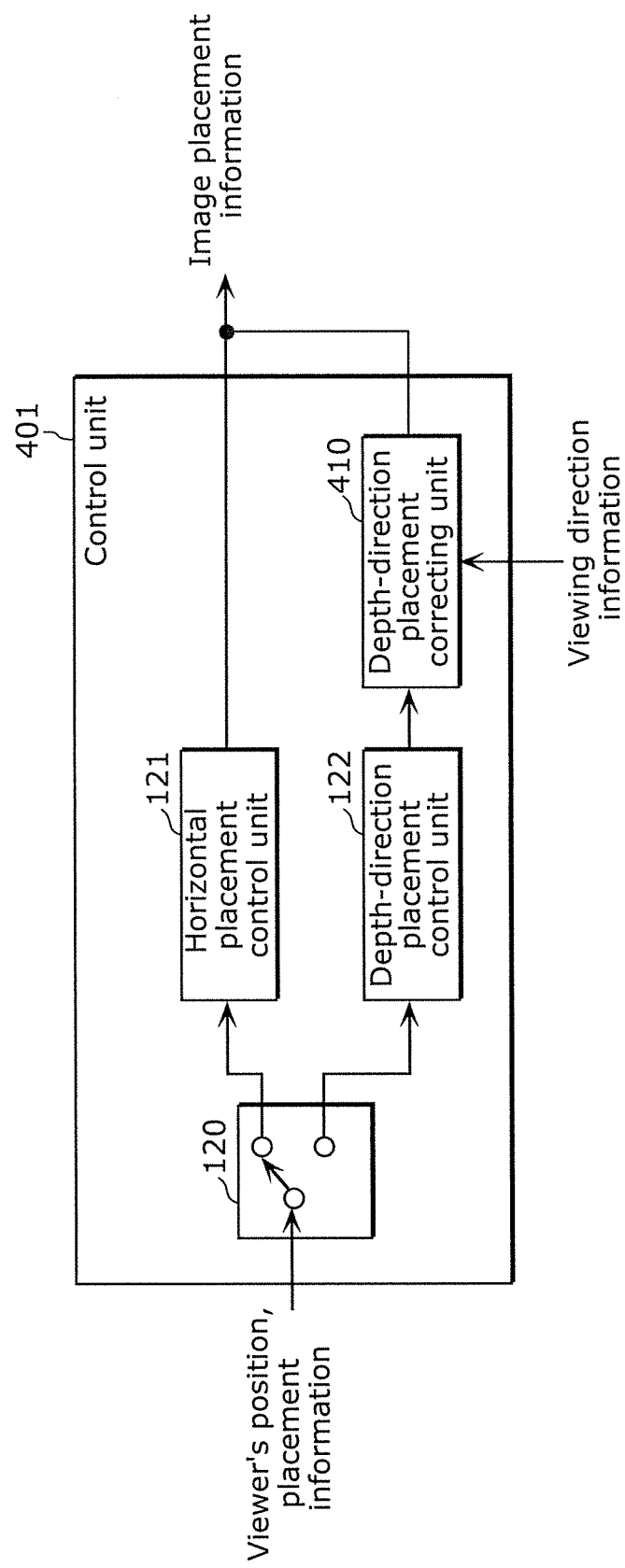
FIG. 16 is a block diagram of a configuration of a control unit according to the embodiment 2.

FIG. 15 is a block diagram of a configuration of the video display apparatus according to the embodiment 2. FIG. 16 is a block diagram of a configuration of a control unit according to the embodiment 2.

As shown in FIG. 15, a video display apparatus 290 is different from the video display apparatus 100 in that the video display apparatus 290 includes a control unit 401 and a viewing direction detection unit 400.

The viewing direction detection unit 400 detects a viewing direction of the observer.

The control unit 401 shifts the display position of the video and controls placement of disparity images, based on positional information of the observer (the head) detected and the viewing direction of the observer detected.

As shown in FIG. 16, the control unit 401, more specifically, includes a horizontal placement control unit 121, a depth-direction placement control unit 122, and a depth-direction placement correcting unit 410.

The horizontal placement control unit 121, as with the embodiment 1, provides control to shift, in the horizontal direction, the display position of the video in units of sub-pixels, as a function of the viewing position (the position of the observer in the side-to-side direction (the horizontal direction)).

The depth-direction placement control unit 122 provides control (disparity-image displacement control) to vary the number n of sub-pixels of at least one unit of display among units of display, as a function of a viewing distance Ld and the viewing position if the viewing distance Ld varies to a distance different from a preferred viewing distance Lc.

The depth-direction placement correcting unit 410 changes the at least one unit of display the number n of sub-pixels of which is to be varied by the depth-direction placement control unit 122 to another at least one unit of display (corrects the location of discontinuity), based on the viewing direction (viewing direction information) detected.

[Operation]

Figure 17:
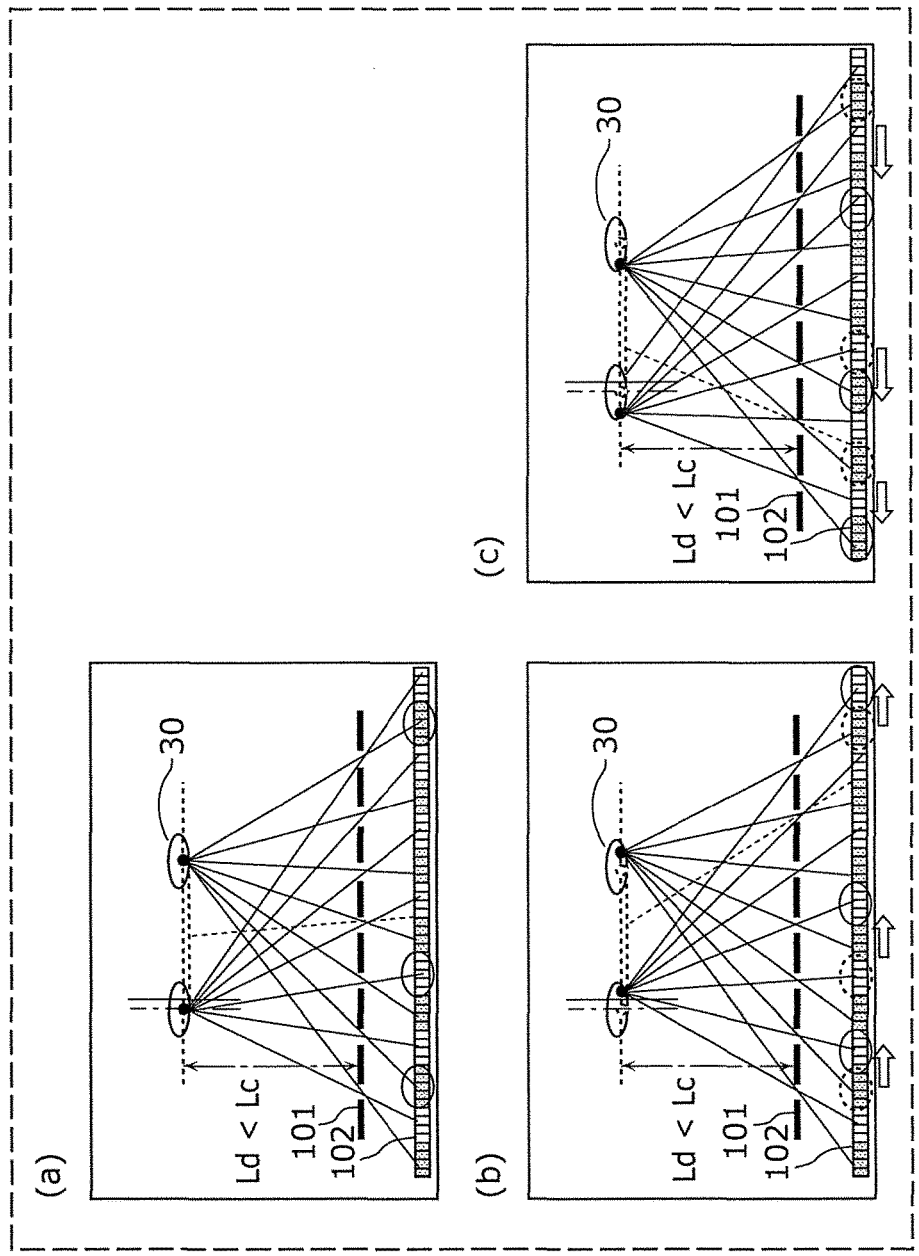
FIG. 17 is a diagram for illustrating operation of the video display apparatus according to the embodiment 2.

In the following, operation of the video display apparatus 290 is described. FIG. 17 is a diagram for illustrating operation of a video display apparatus 390.

If an observer 30 at a preferred viewing position (a position at which the observer can clearly, separately view the disparity images, which position is arranged at every interocular distance E) at the preferred viewing distance Lc moves in the horizontal direction, the horizontal placement control unit 121 provides the shift control over the display position of the video. Specifically, if the observer 30 moves by Δhn, the horizontal placement control unit 121 shifts the display position of the video by one sub-pixel in a direction opposite to the direction in which the head of the observer 30 has moved.

If the observer 30 is viewing the video at the viewing distance Ld different from the preferred viewing distance Lc, and moves by Δhnd, the horizontal placement control unit 121 shifts the display position of the video by one sub-pixel in a direction opposite to the direction in which the head of the observer 30 has moved. Additionally, the depth-direction placement control unit 122, as shown in (a) of FIG. 17, varies the number n of sub-pixels of at least one unit of display (the units of display enclosed by the ellipses in (a) of FIG. 17) among the units of display so that an average value of the number of sub-pixels of the units of display is n'.

As with the embodiment 1, the number of sub-pixels may be varied in any way insofar as the average pitch n' is achieved. For example, the basic unit may be repeated starting with a sub-pixel at a position corresponding to the current center position between the eyes of the observer 30 to the screen edges. Alternatively, the number n of sup-pixels of the at least one unit of display near a region in front of the head position of the observer 30 may be unchanged and the number n of sup-pixels of at least one unit of display farther away therefrom may be increased or reduced.

Here, the control unit 401 of the video display apparatus 290 extracts a face region and eye regions of the observer 30, based on an image captured by a camera 108. The control unit 401, more specifically, detects a direction in which the eyes are pointing and positions of the irises in the eyes.

The depth-direction placement correcting unit 410 changes the at least one unit of display, the number n of sub-pixels of which is to be varied, to another at least one unit of display, based on a view point position detected.

For example, as shown in (b) of FIG. 17, if the line of sight of the observer 30 pointing at the center of the screen changes to the left (as seen by the observer 30), the at least one unit of display, having sub-pixels the number of which is to be varied, is changed to another at least one unit of display that is positioned more to the left, as seen by the observer 30, of at least one unit of display the number n of sub-pixels of which has been varied when the eyes were centered.

Likewise, as shown in (c) of FIG. 17, if the line of sight of the observer 30 pointing at the center of the screen changes to the right, the at least one unit of display, having sub-pixels the number of which is to be varied, is changed to another at least one unit of display that is positioned more to the right, as seen by the observer 30, of at least one unit of display the number n of sub-pixels of which has been varied when the eyes were centered.

This can expand the viewing zone in which the observer 30 can clearly view the disparity images. In should be noted that when changing at least one unit of display, the number n of sub-pixels of which is to be varied, to another at least one unit of display, preferably, the at least one unit of display changed to is as close as possible to at least one unit of display the number n of sub-pixels of which has been varied as a function of a variation in direction of the line of sight.

It should be noted that an amount Δe of shift of the eyes from when they are centered (an amount of shift of the eyes to the left or right relative to the eyes when centered) may be added to or subtracted from the horizontal distance LenH of Equation (2) indicated in the above. In other words, the view point position may be taken into account in determining the horizontal distance LenH. In this case, the depth-direction placement control unit 122 does not change the at least one unit of display the number n of sub-pixels of which is to be varied to another at least one unit of display, as described with reference to (b) and (c) of FIG. 17.

[Summary]

As described above, the viewing direction detection unit 400 of the video display apparatus 290 detects a viewing direction of the viewer (the observer), and the control unit 401 changes, as a function of the viewing direction detected, at least one unit of display, having sub-pixels the number of which is to be varied, to another at least one unit of display.

Specifically, if the viewing direction which is detected changes from the right to the left as seen by the viewer, the control unit 401 changes the at least one unit of display, having sub-pixels the number of which is to be varied, to another at least one unit of display that is more to the left as seen by the viewer. If the viewing direction which is detected changes from the left to the right as seen by the viewer, the control unit 401 changes the at least one unit of display, having sub-pixels the number of which is to be varied, to another at least one unit of display that is more to the right as seen by the viewer.

This can further relax viewing zone constraints on the viewer's movement in the front-rear direction. In other words, this can further expand the range where the viewer can properly view the 3D video, and display the glasses free 3D video, following changes in viewing position of the viewer.

It should be noted that the method for detecting the viewing direction is not particularly limited. For example, the viewing direction may be detected by estimating a viewing direction from a view point position.

Embodiment 3

In the following, a video display apparatus according to an embodiment 3 is to be described. The video display apparatus according to the embodiment 3 alters the timing of when n sub-pixels are shifted, as a function of a viewing distance Ld of an observer to a display apparatus. This expands a viewing zone when the observer moves in a depth direction. In the embodiment 3 below, difference from the embodiment 1 is mainly described and description already set forth in the embodiment 1 may be omitted.

[Configuration]

Figure 18:
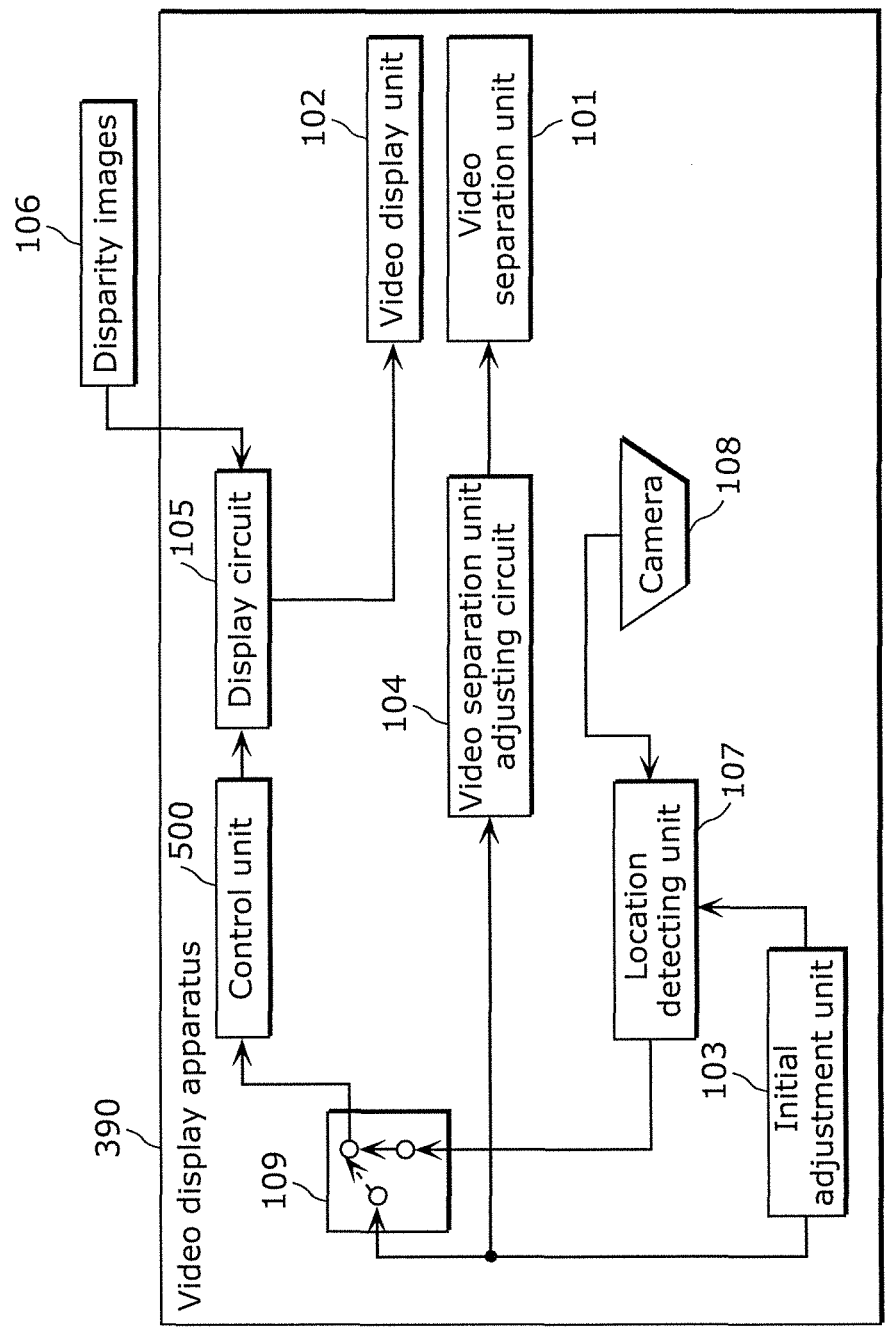
FIG. 18 is a block diagram of a configuration of a video display apparatus according to an embodiment 3.
Figure 19:
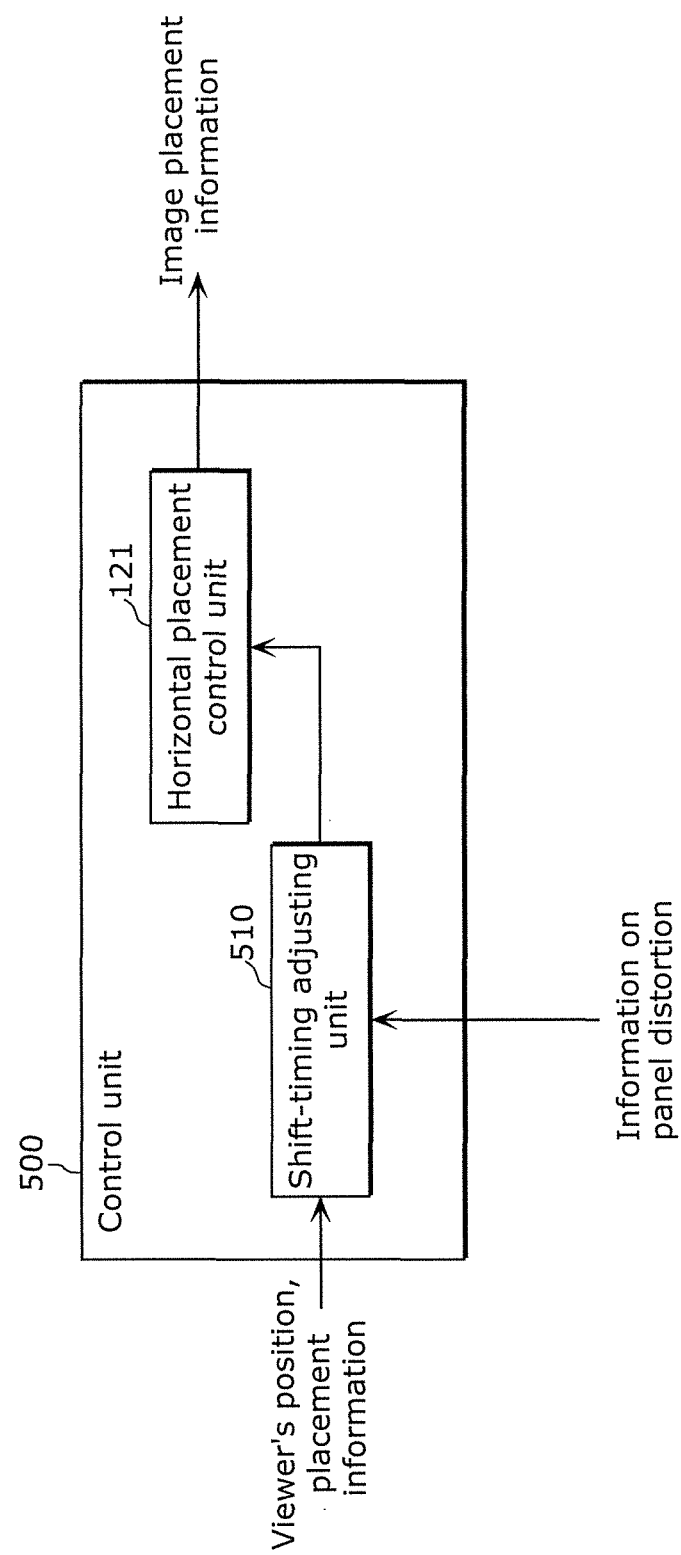
FIG. 19 is a block diagram of a configuration of a control unit according to the embodiment 3.

FIG. 18 is a block diagram of a configuration of the video display apparatus according to the embodiment 3. FIG. 19 is a block diagram of a configuration of a control unit according to the embodiment 3.

A video display apparatus 390 is different from the video display apparatus 100 in operation of a control unit 500. The control unit 500 alters the timing of when the control unit 500 provides shift control over disparity images, as a function of the viewing distance Ld of the observer to the video display apparatus 390.

As shown in FIG. 19, the control unit 500, more specifically, includes a shift-timing adjusting unit 510 and a horizontal placement control unit 121.

The shift-timing adjusting unit 510 determines the timing of when the display position of a video displayed by the video display unit 102 is shifted as a function of the viewing distance Ld of the observer to the video display apparatus 390.

The horizontal placement control unit 121 performs processing of shifting (the shift control) the display position of the video at the timing determined by the shift-timing adjusting unit 510.

[Operation]

Figure 20:
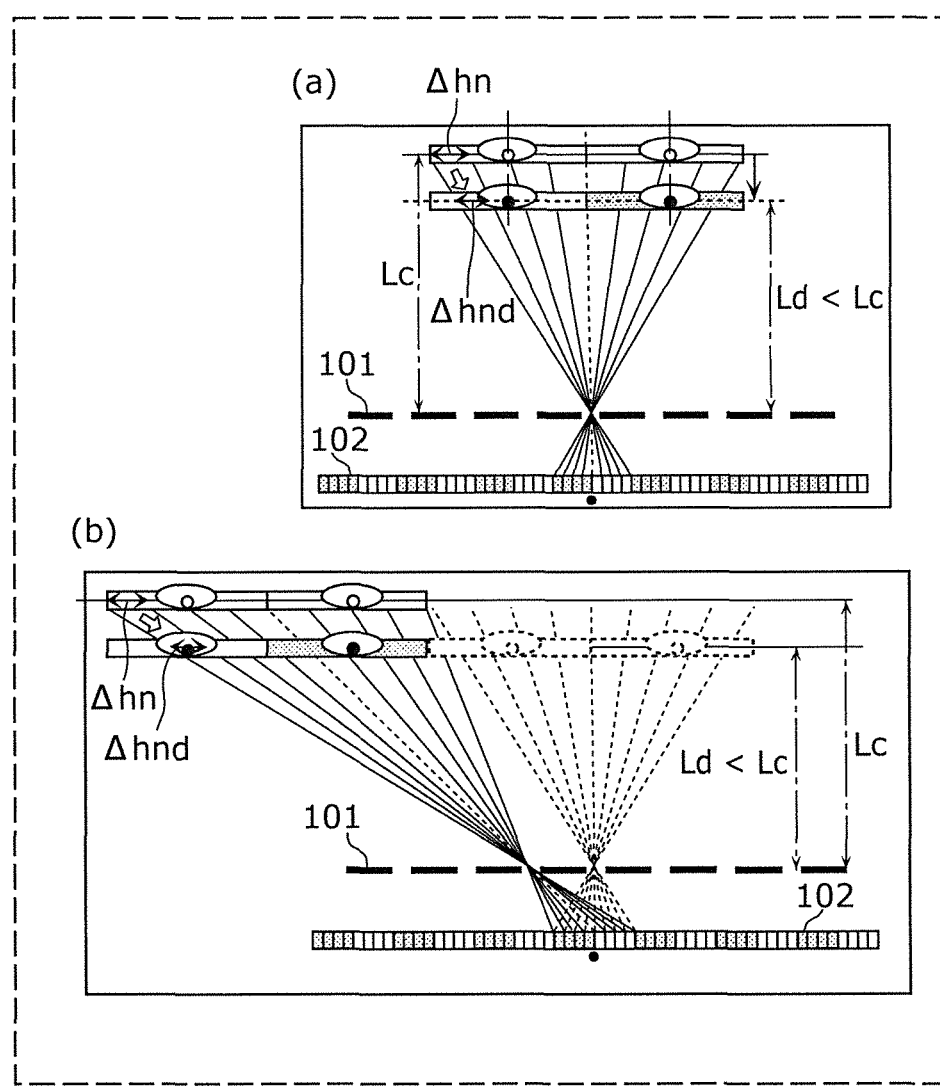
FIG. 20 is a diagram for illustrating operation of the video display apparatus according to the embodiment 3.

In the following, operation of the video display apparatus 390 is described. FIG. 20 is a diagram for illustrating operation of the video display apparatus 390.

First, the case where there is no panel distortion on the video display unit 102 is described.

If an observer 30 at a preferred viewing position (a position at which the observer can clearly, separately view the disparity images, which position is arranged at every interocular distance E) at the preferred viewing distance Lc moves in the horizontal direction, the horizontal placement control unit 121 provides the shift control over the display position of the video. Specifically, if the observer 30 moves by Δhn in the case where there is no panel distortion on the video display unit 102, the horizontal placement control unit 121 shifts the display position of the video by one sub-pixel in a direction opposite to the direction in which the head of the observer 30 has moved. This expands a viewing zone in the horizontal direction.

In contrast, if the observer 30 is at the viewing distance Ld different from the preferred viewing distance Lc and moves by Δhnd, the horizontal placement control unit 121 shifts the display position of the video by one sub-pixel in a direction opposite to the direction in which the head of the observer 30 has moved.

For example, if Ld<Lc, Δhnd by which the observer 30 in front of the screen moves to the right is less than Δhn. Thus, assume that the observer 30 moves at a constant speed, the timing of when the horizontal placement control unit 121 shifts the video to the left by one sub-pixel for the observer 30 positioned at the viewing distance Ld is earlier than the timing of shifting the video to the left by one sub-pixel for the observer 30 positioned at the preferred viewing distance Lc ((a) of FIG. 20).

On the other hand, Δhndd by which the observer 30 in front of the screen at a viewing distance Ldd (Ldd>Lc), farther away from the screen than the preferred viewing distance Lc is, moves to the right is greater than Δhn. Thus, assume that the observer 30 moves at a constant speed, the timing of when the horizontal placement control unit 121 shifts the video to the left by one sub-pixel for the observer 30 positioned at the viewing distance Ldd is later than the timing of shifting the video to the left by one sub-pixel for the observer 30 positioned at the preferred viewing distance Lc.

When the observer 30 moves at the distance Ld (Ld<Lc) ((b) of FIG. 20) (in the side-to-side direction in FIG. 20), Δhnd depends on the viewing distance Ld, irrespective of the position of the observer 30 in the side-to-side direction (the horizontal direction).

Figure 21:
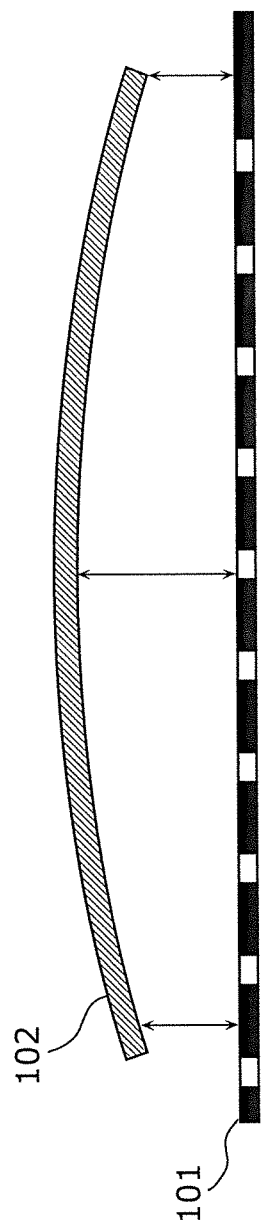
FIG. 21 is a schematic view for illustrating panel distortion on a video display unit according to the embodiment 3.

If, however, there is panel distortion on the video display unit 102 and the video separation unit 101 is not integrally formed with the video display unit 102, a gap between the video separation unit 101 and the video display unit 102 is not uniform. FIG. 21 is a schematic view for illustrating the panel distortion on the video display unit 102.

In particular, as illustrated in FIG. 21, if the video separation unit 101 and the video display unit 102 are secured to each other end to end, the panel is likely to warp in a manner that the gap (a space) between the two reduces toward the screen edges. In this case, a preferred viewing distance Lcd for the pixels at the screen edges of the video display unit 102 is less than the preferred viewing distance Lc for the pixels at the center of the screen. Thus, at the preferred viewing distance Lc, the interocular distance Ed at which the observer 30 can properly view the disparity images at the screen edges is greater than the designed interocular distance E.

Here, the video separation unit 101 is initialized using the center of the screen as a reference. Specifically, the positions of the openings and the light blocking portions are adjusted such that a left-eye image and a right-eye image are separated when viewed by the observer 30 at a predetermined position at the preferred viewing distance Lc. Thus, it is common that Δhnd is determined assuming the gap between the video separation unit 101 and the video display unit 102 at the center of the screen.

If panel distortion as illustrated in FIG. 21 is present, the shift unit Δhndw at the screen edges is greater than Δhnd that is determined assuming the gap at the center of the screen. Due to this, the timing of when the video is shifted at the screen edges need to be later than the timing of when the video is shifted at the center of the screen Δhndw is determined from Equation (11) below.

[Math 11]

$$\Delta hndw = \Delta hnd \times \frac{Ed}{E} \quad (11)$$

The same applies to the case where the observer 30 is positioned at the viewing distance Ldd (Ldd>Lc) farther away from the screen than the preferred viewing distance Lc is. If panel distortion as illustrated in FIG. 21 is present, the shift unit Δhnddw at the screen edges is greater than Δhndd at the center of the screen, due to which the timing of when the video is shifted at the screen edges is later than the timing of when the video is shifted at the center of the screen.

The shift-timing adjusting unit 510 performs correction in which the timings of when the video is shifted at the center of the screen and at the screen edges are altered, as described above. The horizontal placement control unit 121 performs the shift control, according to the correction by the shift-timing adjusting unit 510.

[Summary]

Figure 22:
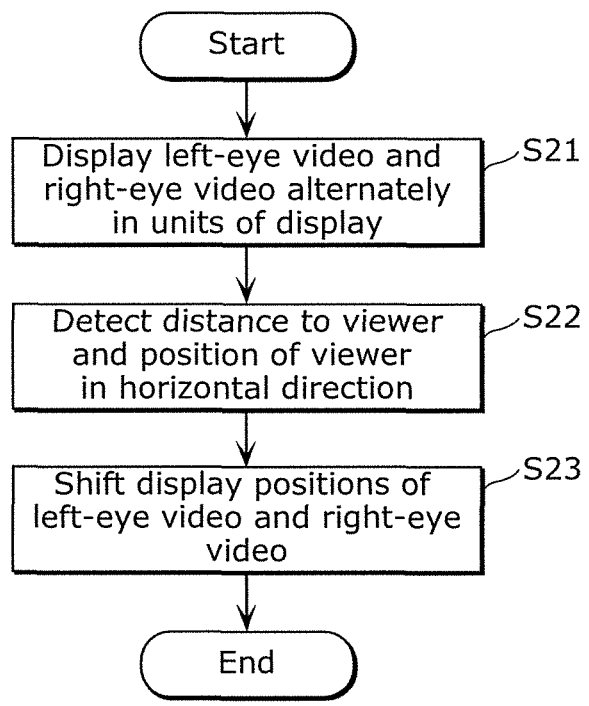
FIG. 22 is a flowchart illustrating operation of the video display apparatus according to the embodiment 3.

Operation (a video display method) of the above-described video display apparatus 390 is to be briefly summarized, with reference to a flowchart. FIG. 22 is a flowchart illustrating operation of the video display apparatus 390.

The video display method illustrated in FIG. 22 is a video display method using the video display apparatus 390 for displaying glasses free 3D videos. The video display apparatus 390 includes the video display unit 102 in which sub-pixels constituting pixels are arranged in a matrix.

First, the control unit 500 of the video display apparatus 390 displays a video in which the left-eye video and the right-eye video are disposed alternately in units of display each unit made up of n (n is an integer equal to or greater than 2) sub-pixels in a row of sub-pixels of the video display unit 102 (S21). The row of sub-pixels refers to alignment of sub-pixels in the row direction of the video display unit 102. In the above embodiment 3, n=4.

Next, the location detecting unit 107 detects a distance from the video display unit 102 to a viewer, and a position of the viewer in the horizontal direction (S22). It should be noted that the horizontal direction as used refers to a direction corresponding to the horizontal direction (the lengthwise direction of the video display unit 102) of the pixels of the video display unit 102, that is, the side-to-side direction (the lateral direction) of the viewer.

The control unit 500 then shifts, by a predetermined number of sub-pixels, the display positions of the left-eye video and the right-eye video in the row of sub-pixels, based on the detected distance from the video display unit 102 to the viewer and the detected position of the viewer in the horizontal direction (S23). While the predetermined number of sub-pixels is 1 in the above embodiment 3, it may be 2 or more.

Specifically, if the distance from the video display unit 102 to the viewer is the viewing distance Ld (a first distance) the control unit 500 shifts the display positions of the left-eye video and the right-eye video by the predetermined number of sub-pixels, in response to Δhnd (a first amount of movement) of the viewer in the horizontal direction. If the distance from the video display unit 102 to the viewer is the preferred viewing distance Lc (a second distance) greater than the viewing distance Ld, the control unit 500 shifts the display positions of the left-eye video and the right-eye video by the predetermined number of sub-pixels, in response to Δhn (a second amount of movement) of the viewer in the horizontal direction, Δhn being greater than Δhnd.

This can relax viewing zone constraints on the viewer's movement in the front-rear direction. In other words, this can expand the range where the viewer can properly view the 3D video, and display the glasses free 3D video, following changes in viewing position of the viewer. In such a video display method, an interpolated image is not generated nor displayed. Thus, cross-talk and blur due to interpolation can be reduced.

Preferably the number n of sub-pixels is an integer equal to or greater than 4 because this allows a video to be displayed, more smoothly following the horizontal movement of the viewer, since the display position of the video is shifted by one sub-pixel as the viewer moves by E/n in the horizontal direction (the lateral direction).

Such a process of shifting the display position of a video is advantageous that it can be achieved in a simpler fashion than the disparity-image placement control.

The control unit 500 also obtains panel distortion information (information on distortion) on the video display unit 102, and, furthermore, uses the panel distortion information to shift the video by the predetermined number of sub-pixels.

Specifically, if the panel distortion information indicates that the space between the video display unit 102 and the video separation unit 101 is greater at the edges of the video display unit 102 than at the center of the video display unit 102, the closer the position of the viewer in the horizontal direction to the screen edge, the greater the amount of horizontal movement of the viewer in response to which the control unit 500 shifts the video by the predetermined number of sub-pixels. If the panel distortion information indicates that the space between the video display unit 102 and the video separation unit 101 is smaller at the center of the video display unit 102 than at the edges of the video display unit 102, the closer the position of the viewer in the horizontal direction to the screen edge, the less the amount of horizontal movement of the viewer in response to which the control unit 500 shifts the video by the predetermined number of sub-pixels, as described below.

This allows a range in which the viewer can properly view the 3D video to be expanded, taking the distortion on the video display unit 102 (a display panel) into account.

Unlike FIG. 21, if the video display unit 102 and the video separation unit 101 are bonded together at the center of the screen, the gap between the two due to the distortion on the video display unit 102 is likely to increase toward the screen edges.

In this case, since the gap between the barrier and the panel is great at the screen edges of the video display unit 102, a preferred viewing distance Lcd2 for the pixels at a screen edge is greater than the preferred viewing distance Lc for the pixels at the center of the screen. Thus, the interocular distance Ed2 for the viewer positioned at the preferred viewing distance Lc to properly view the disparity images at the screen edges is less than the designed interocular distance E.

Due to this, if such panel distortion is present, the shift unit Δhndw2 at the screen edges is less than Δhnd that is determined assuming the gap at the center of the screen. In the other words, due to this, the timing of when the video is shifted at the screen edges need to be earlier than the timing of when the video is shifted at the center of the screen. This tendency is the same in any position at the viewing distance Ldd (Ldd>Lc) farther away than the preferred viewing distance Lc.

Embodiment 4

In an embodiment 4, a video display apparatus is described which further has functionality of detecting a viewing direction (a view point position) of an observer, in addition to the configuration of the video display apparatus 390.

In the embodiment 4 below, difference from the embodiment 3 is mainly described and description already set forth in the embodiment 3 may be omitted.

[Configuration]

Figure 23:
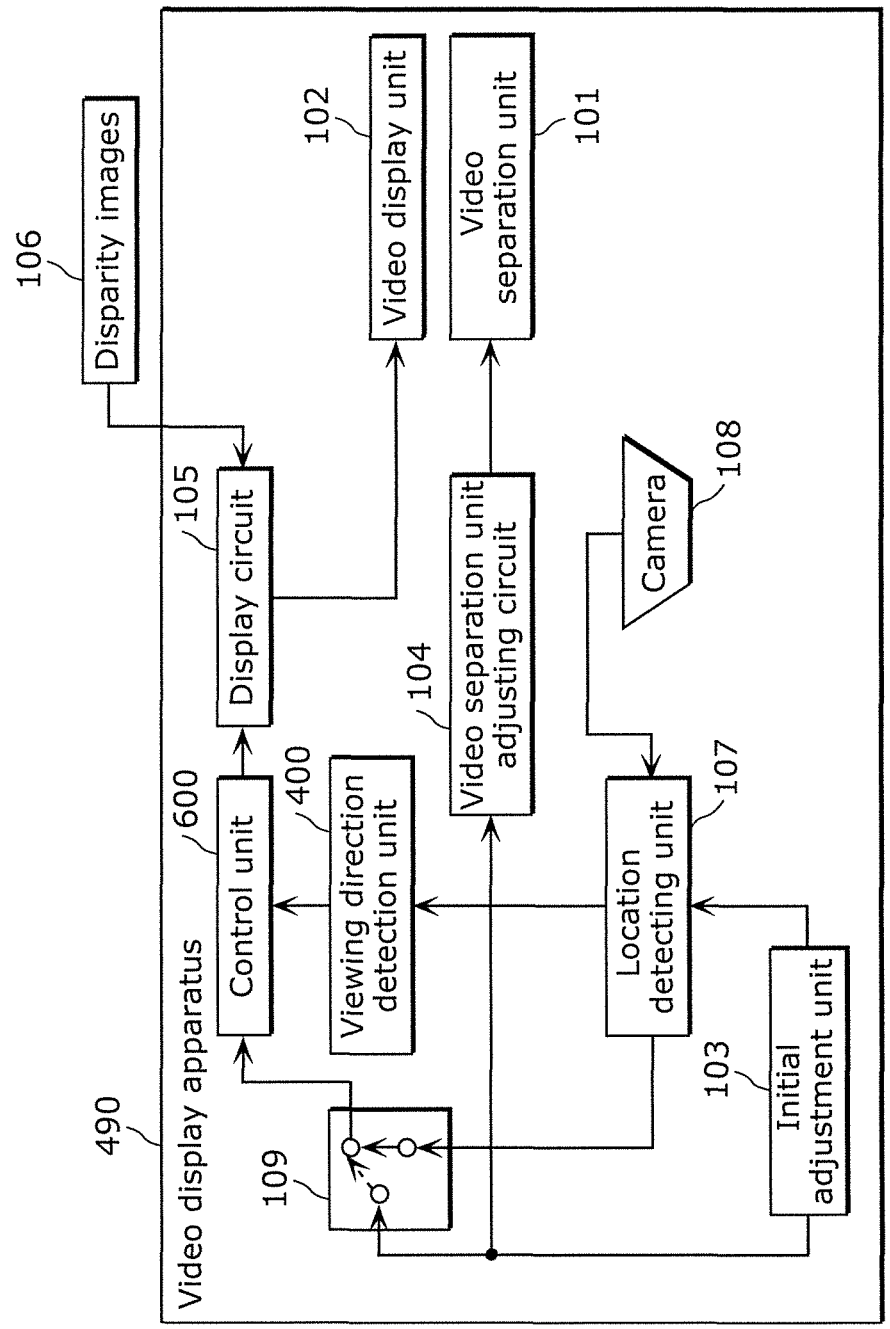
FIG. 23 is a block diagram of a configuration of a video display apparatus according to an embodiment 4.
Figure 24:
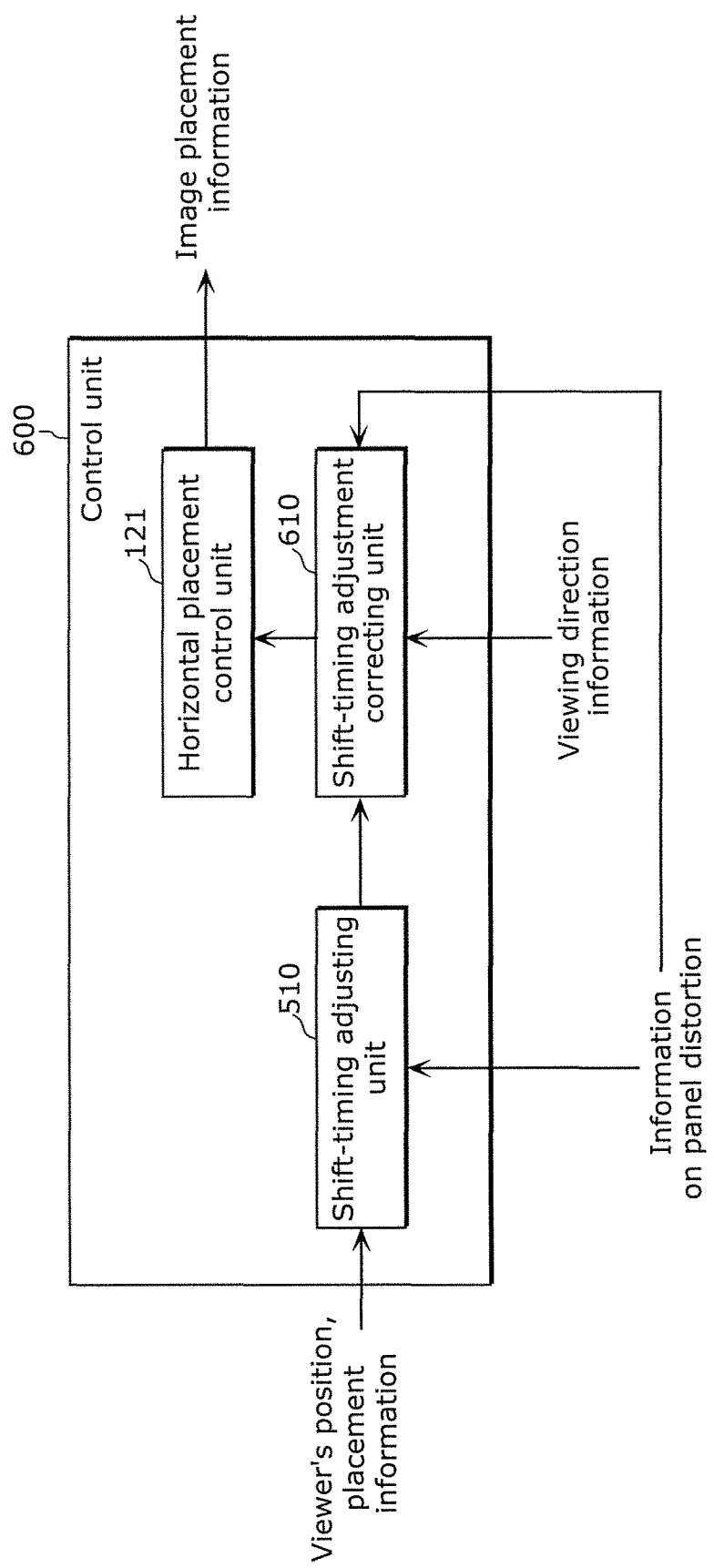
FIG. 24 is a block diagram of a configuration of a control unit according to the embodiment 4.

FIG. 23 is a block diagram of a configuration of a video display apparatus according to the embodiment 4. FIG. 24 is a block diagram of a configuration of a control unit according to the embodiment 4.

As shown in FIG. 23, a video display apparatus 490 is different from the video display apparatus 390 in that the video display apparatus 490 includes a control unit 600 and a viewing direction detection unit 400.

The viewing direction detection unit 400 detects a viewing direction of the observer from image data captured by a camera 108.

The control unit 600 shifts a display position of a video, based on detected positional information of the observer (the head) and the detected viewing direction of the observer.

As shown in FIG. 24, the control unit 600, more specifically, includes a shift-timing adjusting unit 510, a shift-timing adjustment correcting unit 610, and a horizontal placement control unit 121.

The shift-timing adjusting unit 510 determines the timing of when the display position of the video is to be shifted as a function of a viewing distance Ld of the observer.

The shift-timing adjustment correcting unit 610 corrects the shift timing determined by the shift-timing adjusting unit 510, based on the detected viewing direction (viewing direction information) and information indicating the presence or absence of panel distortion.

The horizontal placement control unit 121 performs processing of shifting the display position of the video at the timing corrected by the shift-timing adjustment correcting unit 610.

[Operation]

Figure 25:
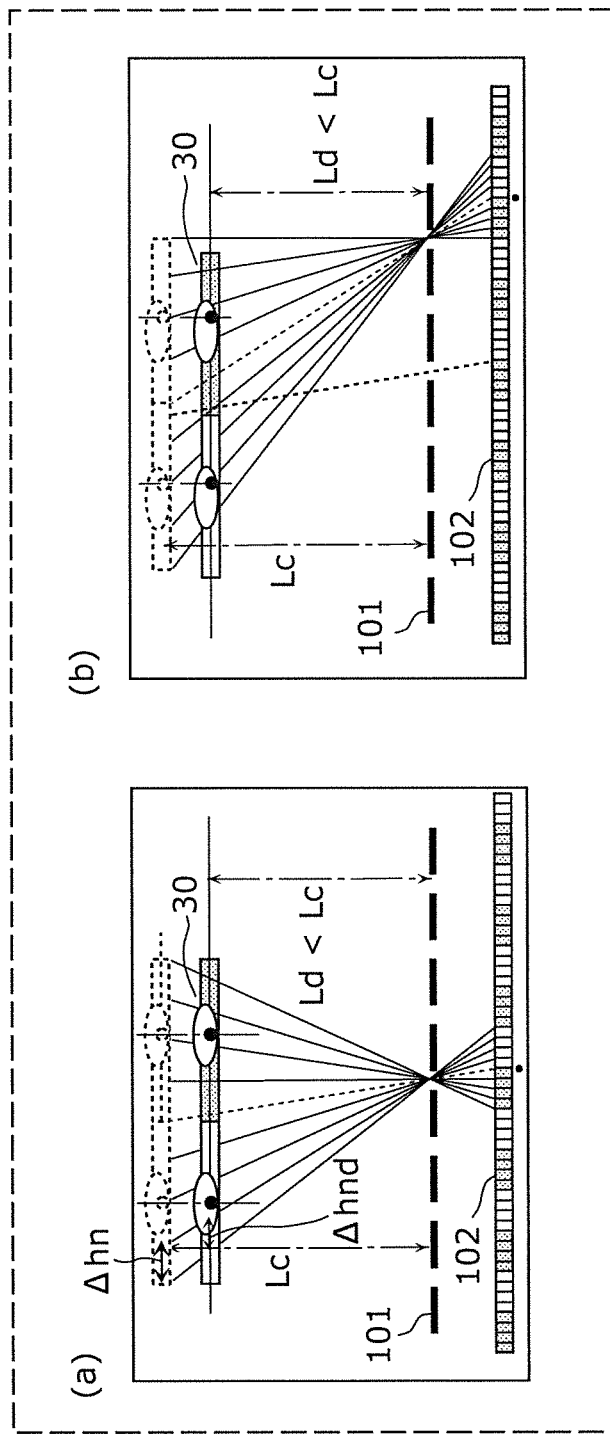
FIG. 25 is a diagram for illustrating operation of the video display apparatus according to the embodiment 4.

In the following, operation of the video display apparatus 490 is described. FIG. 25 is a diagram for illustrating operation of the video display apparatus 490.

First, the case where there is no panel distortion on the video display unit 102 is described.

If an observer 30 at a preferred viewing position (a position at which the observer can clearly, separately view the disparity images, which position is arranged at every interocular distance E) at the preferred viewing distance Lc moves in the horizontal direction, the horizontal placement control unit 121 provides the shift control over the display position of the video. Specifically, if the observer 30 moves by Δhn and there is no panel distortion on the video display unit 102, the horizontal placement control unit 121 shifts the display position of the video by one sub-pixel in a direction opposite to the direction in which the head of the observer 30 has moved. This expands a viewing zone in the horizontal direction.

In contrast, if the observer 30 is at the viewing distance Ld different from the preferred viewing distance Lc and moves by Δhnd, the horizontal placement control unit 121 shifts the display position of the video by one sub-pixel in a direction opposite to the direction in which the head of the observer 30 has moved.

For example, if Ld<Lc, Δhnd is less than Δhn. Thus, assume that the observer 30 moves at a constant speed, the timing of when the horizontal placement control unit 121 shifts the video to the left by one sub-pixel for the observer 30 positioned at the viewing distance Ld is earlier than the timing of shifting the video to the left by one sub-pixel for the observer 30 positioned at the preferred viewing distance Lc ((a) of FIG. 25).

When no panel distortion is present, the value of Δhnd depends on the viewing distance Ld, and remains unchanged no matter where the observer 30 moves to.

As also described in the embodiment 3, however, if there is panel distortion on the video display unit 102 and the video separation unit 101 is not integrally formed with the video display unit 102, a gap between the video separation unit 101 and the video display unit 102 is not uniform.

In particular, as illustrated in FIG. 21, if the video separation unit 101 and the video display unit 102 are secured to each other end to end, the panel is likely to warp in a manner that the gap (a space) between the two reduces toward the screen edges. In this case, a preferred viewing distance Lcd for the pixels at the screen edges of the video display unit 102 is less than the preferred viewing distance Lc for the pixels at the center of the screen. Thus, at the preferred viewing distance Lc, the interocular distance Ed at which the observer 30 can properly view the disparity images at the screen edges is greater than the designed interocular distance E.

Here, the video separation unit 101 is initialized using the center of the screen as a reference. Specifically, the positions of the openings and the light blocking portions are adjusted such that a left-eye image and a right-eye image are separated when viewed by the observer 30 at a predetermined position at the preferred viewing distance Lc. Thus, it is common that Δhnd is determined assuming the gap between the video separation unit 101 and the video display unit 102 at the center of the screen.

In such a case, the shift unit Δhndw at the screen edges is greater than Δhnd that is determined assuming the gap at the center of the screen. Due to this, the timing of when the video is shifted at the screen edges need to be later than the timing of when the video is shifted at the center of the screen. Δhndw is determined from Equation (11) indicated above.

In the embodiment 4, the shift-timing adjustment correcting unit 610 corrects the shift unit Δhnd or Δhndw, taking the viewing direction of the observer into account.

If no panel distortion is present on the video display unit 102, an amount Δe of shift of the eyes from when they are centered is added to or subtracted from an amount of movement of the head of the observer 30, and whether to shift the display position of the video is determined based on whether the total amount of movement, which is a result of the arithmetic operation, has reached Δhnd. If the direction of movement of the head of the observer 30 is the same direction in which the viewing direction has shifted, the amount Δe of shift of the eyes is added to the amount of movement of the head of the observer 30, and subtracted therefrom, otherwise.

On the other hand, if panel distortion is present on the video display unit 102 (the center of the video display unit 102 is warped concavely as illustrated in FIG. 21), the shift unit Δhndw2 is used in which the viewing direction of the observer is taken into account in addition to the head position of the observer 30, as schematically illustrated in (b) of FIG. 25.

For example, if the observer 30 is in front of the right front side of the display screen and the eyes are looking to the right (the viewing direction is the right hand side), the shift unit Δhndw2 is less than Δhndw and the timing of when the display position of the video is shifted is earlier than timing of shifting the display position of the video when the observer 30 is in front of the right front side of the display screen and the eyes are centered.

In contrast, as shown in (b) FIG. 25, if the observer 30 is in front of the right front side of the display screen and the eyes are looking to the left, the shift unit Δhndw2 is greater than Δhndw and the timing of when the display position of the video is shifted is gradual (later) than timing of shifting the display position of the video when the observer 30 is in front of the right front side of the display screen and the eyes are centered.

[Summary]

As described above, the viewing direction detection unit 400 of the video display apparatus 490 detects a viewing direction of the viewer (the observer), and the control unit 600, using the detected viewing direction of the viewer, shifts the display positions of a left-eye video and a right-eye video by a predetermined number of sub-pixels.

This can further relax the viewing zone constraints on the viewer's movement in the front-rear direction. In other words, this can expand the range where the viewer can properly view the 3D video, and display the glasses free 3D video smoothly, following changes in viewing position of the viewer.

Additionally, such a process of shifting the display position of a video is advantageous that it can be achieved in a simpler fashion than the disparity-image placement control.

Other Embodiments

As such, the embodiments 1 to 4 have been described as an example of the technology disclosed herein. The technology according to the present disclosure is, however, not limited thereto and is applicable to any embodiments to which modifications, permutations, additions, and omissions are made as appropriate. Alternatively, the components set forth with reference to the above embodiments 1 to 4 described above may be combined into a new embodiment.

Thus, in the following, other embodiments are to be described together.

In the above embodiments, the video display unit 102 is by way of example of the display unit. The video display unit 102 may be anything insofar as it can display the disparity images. Examples of the video display unit 102 include an LCD panel which includes a backlight source, a self-emissive PDP, and an organic EL panel.

While, in the above embodiments, the head position is detected using one image captured by the camera 108, the head position may be detected in two or more images and the detection results may be combined. Alternatively, a result of face detection and a result of distance estimate (example: distance estimate using a stereo camera), which is obtained by a multiview method using images captured from two or more different positions, can be combined.

The head position detection is an example of a method for detecting a position of an observer. For the position detection, any other method, such as TOF mentioned in the embodiment 1 may be employed. As the method for detecting a position of an observer, for example, a method using wired connection may also be employed in which three-dimensional position measurement is conducted using electromagnetic force or the like. Moreover, for the detection of a position of an observer, a method may be employed in which a predetermined test pattern is constantly displayed in an image and geometric measurement is conducted based on a size of the test pattern portion displayed or based on changes in moire, for example. Alternatively, the position of the observer may be detected by, for example, detecting the whole person, detecting the eyes, or extracting eye regions, other than by detecting the head of the observer.

Moreover, while the above embodiments have been described, assuming one observer, it is also contemplated that a plurality of observers are present. In such a case, it is envisaged that the object of observer-position detection is an observer who is closest to the video display apparatus or an observer who is occupying a greatest portion of an image.

If a number of people are lined side by side in such a case, the group of people may be the object of the position detection or a person of interest may be the object of the position detection. In the case of application of the technology disclosed herein for use in fields (e.g., endoscopic surgical field) that require more accuracy in shift control, it is contemplated that the shift control is provided mainly for a primary person.

In such a case, the primary person may be the object of the position detection or a group including the primary person may be the object of the position detection, and a video displayed by another video display apparatus engaged with what is being seen by the primary person may be provided to an observer who is at some distance from the primary person or the group including the primary person.

The disparity-image placement control and the shifting of the display position of a video in the above embodiments may be performed in real time using a CPU, GPU, and so on, or may be performed using a prepared LUT table.

While the description has been given that the video separation unit 101 is of a slanted barrier structure in the above embodiments, the present disclosure is also applicable to the cases where the video separation unit 101 is of a vertical-stripe barrier structure, and where the video separation unit 101 is of a step barrier structure. It should be noted that in the step barrier structure, openings corresponding to rectangular shapes of the sub-pixels are arranged obliquely.

Moreover, the video separation unit 101 may be a Lenticular lens. In this case, barriers may additionally be combined to reduce leakage of light from the lens boundary of the Lenticular lens, and the index of refraction of the Lenticular lens may be controlled using a liquid crystal, for example.

Figure 26:
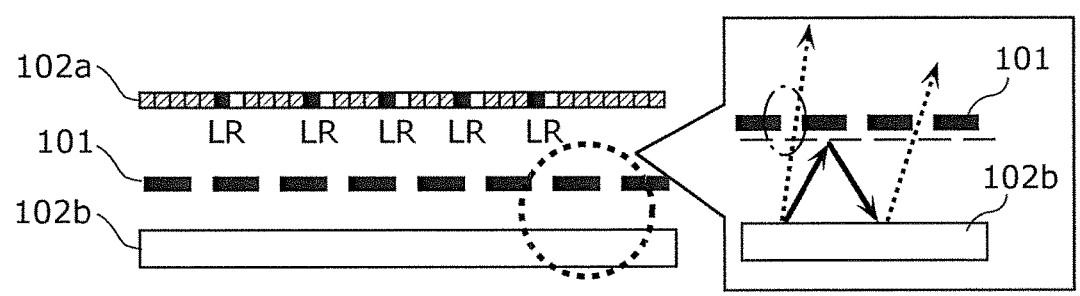
FIG. 26 is a diagram showing an example of the video display apparatus which includes a video separation unit between an LCD panel and a backlight.
Figure 27:
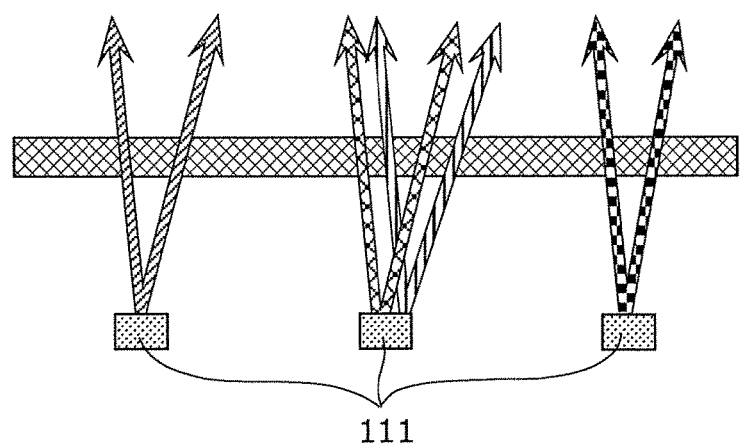
FIG. 27 is a diagram showing an example of the video display apparatus which includes stripe-shaped light-emitting parts as the backlight.

While the description has been given that the video separation unit 101 is disposed in front of the video display unit 102 in the above embodiments, the video separation unit 101 may be disposed between an LCD panel 102a and a backlight 102b in the video display unit 102 (a liquid crystal display) as shown in FIG. 26. Alternatively, as shown in FIG. 27, stripe-shaped light-emitting parts 111 (light sources) may be used as the backlight of the liquid crystal display, in place of the video separation unit 101.

It should be noted that each component in each of the above embodiments may be configured with dedicated hardware or may be implemented by executing a software program suitable for the component. Each component may be implemented by a program execution unit, such as a CPU or processor, loading and executing the software program stored in a recording medium such as a hard disk or a semiconductor memory.

For example, the components may be circuits. These circuits may form one circuitry as a whole or be individual circuits. These circuits may be general purpose circuits or may be dedicated circuits.

The general and specific aspects of the present disclosure may be implemented using a system, a method, an integrated circuit, a computer program, or a computer-readable recording medium such as a CD-ROM. The general and specific aspects of the present disclosure may also be implemented in any combination of systems, methods, integrated circuits, computer programs, or computer-readable recording media.

As such, the embodiments have been described as an example of the technology according to the present disclosure. For that purpose, the accompanying drawings and detailed description have been provided.

Thus, the components set forth in the accompanying drawings and detailed description include not only those essential to solve the problems but also ones unnecessary to solve the problems, for illustrating the above technology. Hence, the unnecessary components should not be acknowledged essential due to the mere fact that they are depicted in the accompanying drawings or set forth in the detailed description.

The above embodiments are for illustrating the technology of the present disclosure, and thus various modifications, permutations, additions, and omissions are possible in the scope of the appended claims and the equivalents thereof.

For example, in the above embodiments, processing performed by a particular processing unit may be performed by another processing unit. The order of processes may be changed or the processes may be performed in parallel.

INDUSTRIAL APPLICABILITY

A video display apparatus according to the present disclosure can smoothly display a glasses free 3D video, following changes in position of an observer, and is applicable to glasses free 3D display apparatuses for signage application and medical application, for example.

REFERENCE SIGNS LIST 10B, 10G, 10R sub-pixel
20 pixel
20L, 40L left-eye image
20R, 40R right-eye image 30 observer
40 pixel
50a, 50b region
100, 290, 390, 490 video display apparatus
101 video separation unit
102 video display unit
102a LCD panel
102b backlight
103 initial adjustment unit
104 video separation unit adjusting circuit
105 display circuit
106 disparity images
107 location detecting unit
108 camera
109 signal switching unit
110, 401, 500, 600 control unit
111 light-emitting part
120 signal switching unit
121 horizontal placement control unit
122 depth-direction placement control unit
200 head detecting unit
201 reference point setting unit
202 viewer location detecting unit
203 horizontal movement determining unit
204 traveled distance determining unit
205 adjustment information output unit
300 skin-color tone detection unit
301 contour detection unit
302 feature extracting unit
303 pattern-matching unit
304 template storage memory
310 illumination light
311 reflected light
318 range detecting unit
319 light-detecting element
320 light-emitting source
321 control circuit unit
323 image generating unit
324 lens
325 light-sensitive unit
326 sensitivity control unit
327 charge integration unit
328 charge collection unit
330 object
400 viewing direction detection unit
410 depth-direction placement correcting unit
510 shift-timing adjusting unit
610 shift-timing adjustment correcting unit

The invention claimed is:

1. A video display method using a display apparatus for displaying a glasses free 3D video, the display apparatus including a display unit in which sub-pixels constituting pixels are arranged in a matrix, the video display method comprising:
(a) displaying, in a row of sub-pixels of the display unit, a video in which a left-eye video and a right-eye video are disposed alternately in units of display each unit made up of n sub-pixels, where n is an integer equal to or greater than 2; and
(b) detecting a distance from the display unit to a viewer, wherein
in step (a),
if the detected distance is different from a predetermined distance, the number of sub-pixels of at least one unit of display, among a plurality of units of display included in the row of sub-pixels, is varied as a function of the detected distance,
if the detected distance is less than the predetermined distance, the number of sub-pixels of the at least one unit of display is increased, and
if the detected distance is greater than the predetermined distance, the number of sub-pixels of the at least one unit of display is reduced.

2. The video display method according to claim 1, wherein
in step (a),
the at least one unit of display, having sub-pixels the number of which is to be increased, includes a unit of display that is at an end of the row of sub-pixels among the plurality of units of display included in the row, and
the at least one unit of display, having sub-pixels the number of which is to be reduced, includes a unit of display that is in a middle of the row of sub-pixels among the plurality of units of display included in the row.

3. The video display method according to claim 1, wherein
step (b) further includes detecting a position of the viewer in a horizontal direction, and
in step (a), display positions of the left-eye video and the right-eye video in the row of sub-pixels are shifted by a predetermined number of sub-pixels, based on the detected distance from the display unit to the viewer and the detected position of the viewer in the horizontal direction.

4. The video display method according to claim 1, further comprising
(c) detecting a viewing direction of the viewer, wherein
step (a) further includes changing the at least one unit of display, having sub-pixels the number of which is to be varied, to another at least one unit of display, as a function of the detected viewing direction.

5. The video display method according to claim 4, wherein
in step (a),
if the viewing direction which is detected changes from right to left as seen by the viewer, the at least one unit of display, having sub-pixels the number of which is to be varied, is changed to another at least one unit of display that is positioned more to the left as seen by the viewer, and
if the viewing direction which is detected changes from the left to the right as seen by the viewer, the at least one unit of display, having sub-pixels the number of which is to be varied, is changed to another at least one unit of display that is positioned more to the right as seen by the viewer.

6. The video display method according to claim 1, wherein
n is an integer equal to or greater than 4.

7. A video display apparatus for displaying a glasses free 3D video, the video display apparatus comprising:
a display unit in which sub-pixels constituting pixels are arranged in a matrix;
a control unit configured to display, in a row of sub-pixels of the display unit, a video in which a left-eye video and a right-eye video are disposed alternately in units of display each unit made up of n sub-pixels, where n is an integer equal to or greater than 2; and
a range detecting unit configured to detect a distance from the display unit to a viewer, wherein
the control unit is configured to:
vary, as a function of the detected distance, the number of sub-pixels of at least one unit of display, among a plurality of units of display included in the row of sub-pixels, if the detected distance is different from a predetermined distance;

increase the number of sub-pixels of the at least one unit of display if the detected distance is less than the predetermined distance; and reduce the number of sub-pixels of the at least one unit of display if the detected distance is greater than the predetermined distance.

8. The video display apparatus according to claim 7, further comprising a viewing direction detection unit configured to detect a viewing direction of the viewer, wherein the control unit is further configured to change the at least one unit of display, having sub-pixels the number of which is to be varied, to another at least one unit of display, as a function of the detected viewing direction.

* * * * *